US012650011B2

(12) United States Patent
    Kamp

(10) Patent No.:    US 12,650,011 B2
(45) **Date of Patent:       \*Jun. 9, 2026**

(54) DEVICE AND METHOD FOR ADDITIVE MANUFACTURING OF A COMPONENT

(71) Applicant: PERI SE, Weissenhorn (DE)

(72) Inventor: Carsten Kamp, Weissenhorn (DE)

(73) Assignee: PERI SE, Weissenhorn (DE)

( \* ) Notice: Subject to any disclaimer, the term of this patent is extended or adjusted under 35 U.S.C. 154(b) by 80 days.

This patent is subject to a terminal disclaimer.

(21) Appl. No.: 18/619,799

(22) Filed: Mar. 28, 2024

(65) Prior Publication Data

US 2024/0328144 A1      Oct. 3, 2024

(30) Foreign Application Priority Data

Mar. 28, 2023    (DE) .......................... 102023107845.3

(51) Int. Cl.
    *E04B 1/16*        (2006.01)
    *E04B 1/35*        (2006.01)
           (Continued)

(52) U.S. Cl.
    CPC .............. *E04B 1/16* (2013.01); *E04B 1/3505* (2013.01); *B33Y 10/00* (2014.12); *B33Y 30/00* (2014.12)

(58) Field of Classification Search
    None
    See application file for complete search history.

(56) References Cited

U.S. PATENT DOCUMENTS

| 2,339,892 | A | 1/1944 | Urschel |
| 2,690,901 | A | 10/1954 | McCormack |
| | | (Continued) | |

FOREIGN PATENT DOCUMENTS

| AT | 385550 B | 4/1988 |
| AT | 520143 B1 | 3/2022 |
| | (Continued) | |

OTHER PUBLICATIONS

BOD2 Specifications, www.cobod.com, publication date unknown, pp. 1-18.

(Continued)

*Primary Examiner* — Yung-Sheng M Tsui
*Assistant Examiner* — Melody Tsui
(74) *Attorney, Agent, or Firm* — NIXON & VANDERHYE P.C.

(57)       ABSTRACT

A device for additive manufacturing of a component includes a material dispensing unit for depositing a building material and an actuator assembly which is designed to move the material dispensing unit over a work surface in order to deposit the building material layer by layer in predetermined print paths. The device has at least one first guide leg which is designed to shape a first surface of the one or more layers of building material deposited by the material dispensing unit. The first guide leg is displaceable and driven by an actuator, in at least one translational degree of freedom or rotational degree of freedom relative to the material dispensing unit. The device has a cleaning assembly for cleaning the first guide leg of building material residues during a relative movement of the first guide leg relative to the material dispensing unit.

32 Claims, 5 Drawing Sheets

(51) Int. Cl.
  *B33Y 10/00* (2015.01)
  *B33Y 30/00* (2015.01)

(56) References Cited

U.S. PATENT DOCUMENTS

| | | | |
|---|---|---|---|
| 5,529,471 | A | 6/1996 | Khoshevis |
| 5,975,493 | A | 11/1999 | Ellingson et al. |
| 6,068,025 | A | 5/2000 | Schlecht |
| 7,878,789 | B2 * | 2/2011 | Khoshnevis .......... B28B 11/042 |
| | | | 425/461 |
| 8,568,121 | B2 | 10/2013 | Khoshnevis |
| 8,644,964 | B2 | 2/2014 | Hendron et al. |
| 9,206,601 | B2 | 12/2015 | Khoshnevis |
| 9,707,721 | B2 | 7/2017 | Susnjara |
| 9,840,053 | B2 | 12/2017 | Gramazio et al. |
| 10,618,217 | B2 | 4/2020 | Boyd, IV et al. |
| 11,466,169 | B2 | 10/2022 | Bodkhe et al. |
| 2004/0164436 | A1 * | 8/2004 | Khoshnevis .......... B29C 64/106 |
| | | | 425/463 |
| 2005/0280185 | A1 | 12/2005 | Russell et al. |
| 2008/0206068 | A1 | 8/2008 | Nadler |
| 2010/0257792 | A1 * | 10/2010 | Khoshnevis .......... B29C 48/155 |
| | | | 52/27 |
| 2015/0059408 | A1 | 3/2015 | Abushaev et al. |
| 2017/0320267 | A1 | 11/2017 | Lind et al. |
| 2018/0056544 | A1 | 3/2018 | Kreiger et al. |
| 2018/0093373 | A1 * | 4/2018 | Niederberger ......... B33Y 30/00 |
| 2020/0048893 | A1 | 2/2020 | Martinez et al. |
| 2020/0199862 | A1 | 6/2020 | Le Roux |
| 2020/0341196 | A1 | 10/2020 | Ooki et al. |
| 2021/0107177 | A1 | 4/2021 | Giles |
| 2022/0307277 | A1 | 9/2022 | Moreno et al. |
| 2022/0341196 | A1 | 10/2022 | Joo |

FOREIGN PATENT DOCUMENTS

| | | | | |
|---|---|---|---|---|
| AU | 2020297662 | A | 2/2022 | |
| CA | 2770175 | A1 | 9/2013 | |
| CN | 101177955 | B | 1/2013 | |
| CN | 104947937 | A | 9/2015 | |
| CN | 104453014 | B | 4/2017 | |
| CN | 104985817 | B | 4/2017 | |
| CN | 206106386 | U | 4/2017 | |
| CN | 106799839 | A | 6/2017 | |
| CN | 206317402 | U | 7/2017 | |
| CN | 107023168 | A | 8/2017 | |
| CN | 104532986 | B | 10/2017 | |
| CN | 206317199 | U | 11/2017 | |
| CN | 206690258 | U | 12/2017 | |
| CN | 206749057 | U | 12/2017 | |
| CN | 105946091 | B | 2/2018 | |
| CN | 207028192 | U | 2/2018 | |
| CN | 106193374 | B | 3/2018 | |
| CN | 106426908 | B | 7/2018 | |
| CN | 108237690 | A | 7/2018 | |
| CN | 108548721 | A | 9/2018 | |
| CN | 207972097 | U | 10/2018 | |
| CN | 208084990 | U | 11/2018 | |
| CN | 109537901 | A | 3/2019 | |
| CN | 208774065 | U | 4/2019 | |
| CN | 107097324 | B | 5/2019 | |
| CN | 109732740 | A | 5/2019 | |
| CN | 109732905 | A1 | 5/2019 | |
| CN | 108145828 | B | 6/2019 | |
| CN | 110056192 | A | 7/2019 | |
| CN | 108237613 | B | 11/2019 | |
| CN | 209666288 | U | 11/2019 | |
| CN | 210002944 | U | 1/2020 | |
| CN | 107127963 | B1 | 2/2020 | |
| CN | 210026316 | U | 2/2020 | |
| CN | 108240115 | B | 4/2020 | |
| CN | 111251413 | A | 6/2020 | |
| CN | 111456438 | A | 7/2020 | |
| CN | 211053976 | U | 7/2020 | |
| CN | 110171053 | B | 10/2020 | |
| CN | 109594777 | B | 11/2020 | |
| CN | 111910924 | A | 11/2020 | |
| CN | 111499314 | B | 12/2020 | |
| CN | 108136674 | B | 1/2021 | |
| CN | 109025256 | B | 2/2021 | |
| CN | 112476704 | A | 3/2021 | |
| CN | 112476705 | A | 3/2021 | |
| CN | 112482758 | A | 3/2021 | |
| CN | 212919810 | U | 4/2021 | |
| CN | 212927054 | U | 4/2021 | |
| CN | 112873477 | A | 6/2021 | |
| CN | 112895060 | A | 6/2021 | |
| CN | 113513171 | A | 10/2021 | |
| CN | 214575751 | U | 11/2021 | |
| CN | 214725040 | U | 11/2021 | |
| CN | 215094316 | U | 12/2021 | |
| CN | 113878875 | A | 1/2022 | |
| CN | 111169008 | B | 2/2022 | |
| CN | 114059657 | A | 2/2022 | |
| CN | 215791794 | U | 2/2022 | |
| CN | 110549602 | B | 4/2022 | |
| CN | 110838427 | B | 4/2022 | |
| CN | 114293780 | A | 4/2022 | |
| CN | 216831445 | U | 6/2022 | |
| CN | 114633475 | B | 8/2022 | |
| CN | 217514568 | U | 9/2022 | |
| CN | 107081839 | A | 7/2023 | |
| CZ | 34847 | U1 | 2/2021 | |
| DE | 7514726 | U | 9/1975 | |
| DE | 2749632 | C2 | 7/1979 | |
| DE | 2750055 | C2 | 7/1979 | |
| DE | 7916198 | U1 | 11/1979 | |
| DE | 19543751 | A1 | 5/1996 | |
| DE | 10011379 | A1 | 9/2001 | |
| DE | 202016104820 | U1 | 10/2017 | |
| DE | 102016012348 | A1 | 4/2018 | |
| DE | 102017129740 | A1 | 6/2019 | |
| DE | 102018109501 | A1 | 10/2019 | |
| DE | 102018216792 | A1 | 4/2020 | |
| DE | 102018217141 | A1 | 4/2020 | |
| DE | 102020003760 | | 12/2021 | |
| DE | 112014006481 | | 12/2021 | |
| EP | 0954416 | B1 | 8/2004 | |
| EP | 1722955 | A1 | 9/2005 | |
| EP | 1587995 | B1 | 3/2012 | |
| EP | 2610417 | A1 | 7/2013 | |
| EP | 1945436 | B1 | 3/2015 | |
| EP | 3001822 | B1 | 9/2019 | |
| EP | 3472842 | B1 | 10/2019 | |
| EP | 3117982 | B1 | 12/2019 | |
| EP | 3359320 | B1 | 12/2019 | |
| EP | 3331704 | B1 | 4/2020 | |
| EP | 3626420 | B1 | 7/2021 | |
| EP | 3938597 | A1 | 1/2022 | |
| EP | 4005759 | A1 | 6/2022 | |
| EP | 4011581 | A1 | 6/2022 | |
| EP | 3867065 | B1 | 11/2022 | |
| FR | 3068911 | B1 * | 8/2020 | ......... E04G 21/0463 |
| IN | 201914046371 | | 5/2020 | |
| JP | 2021045906 | A | 3/2021 | |
| JP | 2021053834 | A | 4/2021 | |
| JP | 6903893 | B2 | 7/2021 | |
| JP | 7138527 | B2 | 9/2022 | |
| JP | 7138528 | B2 | 9/2022 | |
| KR | 101648764 | B1 | 8/2016 | |
| KR | 101648766 | B1 | 8/2016 | |
| KR | 101648767 | B1 | 8/2016 | |
| KR | 101648768 | B1 | 8/2016 | |
| KR | 101666181 | B1 | 10/2016 | |
| KR | 101828907 | B1 | 2/2018 | |
| KR | 101914523 | B1 | 11/2018 | |
| KR | 101911404 | B1 | 12/2018 | |
| KR | 101974398 | B1 | 5/2019 | |
| KR | 102036571 | B1 | 10/2019 | |
| KR | 102107988 | B1 | 4/2020 | |
| KR | 102241865 | B1 | 4/2021 | |
| KR | 102374395 | B1 | 3/2022 | |
| KR | 20220096464 | A | 7/2022 | |
| KR | 102439248 | B1 | 9/2022 | |

(56) References Cited

FOREIGN PATENT DOCUMENTS

| KR | 20220132699 | A | 10/2022 | | |
|----|----|----|----|----|----|
| KR | 20220132701 | A | 10/2022 | | |
| RU | 2683447 | C1 | 3/2019 | | |
| RU | 2739244 | C2 | 12/2020 | | |
| RU | 205716 | U1 | 7/2021 | | |
| WO | WO-2005070657 | A1 | * 8/2005 | .......... | B29C 64/118 |
| WO | 2006/101320 | A1 | 9/2006 | | |
| WO | 2009/055580 | A2 | 4/2009 | | |
| WO | 2011/021080 | A2 | 2/2011 | | |
| WO | 2015/197910 | A1 | 12/2015 | | |
| WO | 2017116507 | A1 | 7/2017 | | |
| WO | 2018019644 | A1 | 2/2018 | | |
| WO | WO-2018026011 | A1 | * 2/2018 | .......... | B29C 64/124 |
| WO | 2018052469 | A2 | 3/2018 | | |
| WO | 2018054902 | A1 | 3/2018 | | |
| WO | 2019236493 | A1 | 12/2019 | | |
| WO | 2020131119 | A1 | 6/2020 | | |
| WO | 2020131120 | A1 | 6/2020 | | |
| WO | 2020243823 | A2 | 12/2020 | | |
| WO | 2021104803 | A1 | 6/2021 | | |
| WO | 2022/149859 | A1 | 7/2022 | | |

OTHER PUBLICATIONS https://www.facebook.com/watch/?v=794791914336816, This is how we get 3D printed surface smooth and nice. #apiscor #apiscor3d #additivetechnologies #additivemanufacturing #3dprint #techno #tech . . . , Apis Cor Facebook, Facebook, website page, printed out Apr. 18, 2024, origination date unknown, 1 page.

Pan, Tinghong et al., "Effect of shaping plate apparatus on mechanical properties of 3D printed cement-based materials: Experimental and numerical studies," publication date unknown, 41 pp.

German Search Report dated Feb. 5, 2024 issued in German Patent Application No. 102023107845.3, 9 pp.

German Search Report dated Feb. 5, 2024 issued in German Patent Application No. 102023107846.1, 8 pp.

https://cobod.com/wp-content/uploads/2020/09/BOD2-Specifications-1.pdf, website pages, printed out Apr. 18, 2024, origination date unknown, 4 pp.

Khoshnevis, Behrokh , Automated Construction by Contour Crafting—Related Robotics and Information Technologies, Journal of Automation in Construction, vol. 13, Issue 1, Jan. 2004, pp. 5-19.

https://www.researchgate.net/figure/Contour-crafting-technique-11_fig2_338144676, website pages, printed out Apr. 18, 2024, origination date unknown, 5 pp.

Hwang, Dooil et al., An Innovative Construction Process-Contour Crafting (CC), 22nd International Symposium on Automation and Robotics in Construction, ISARC 2005—Sep. 11-14, 2005, Ferrara (Italy), 6 pp.

* cited by examiner

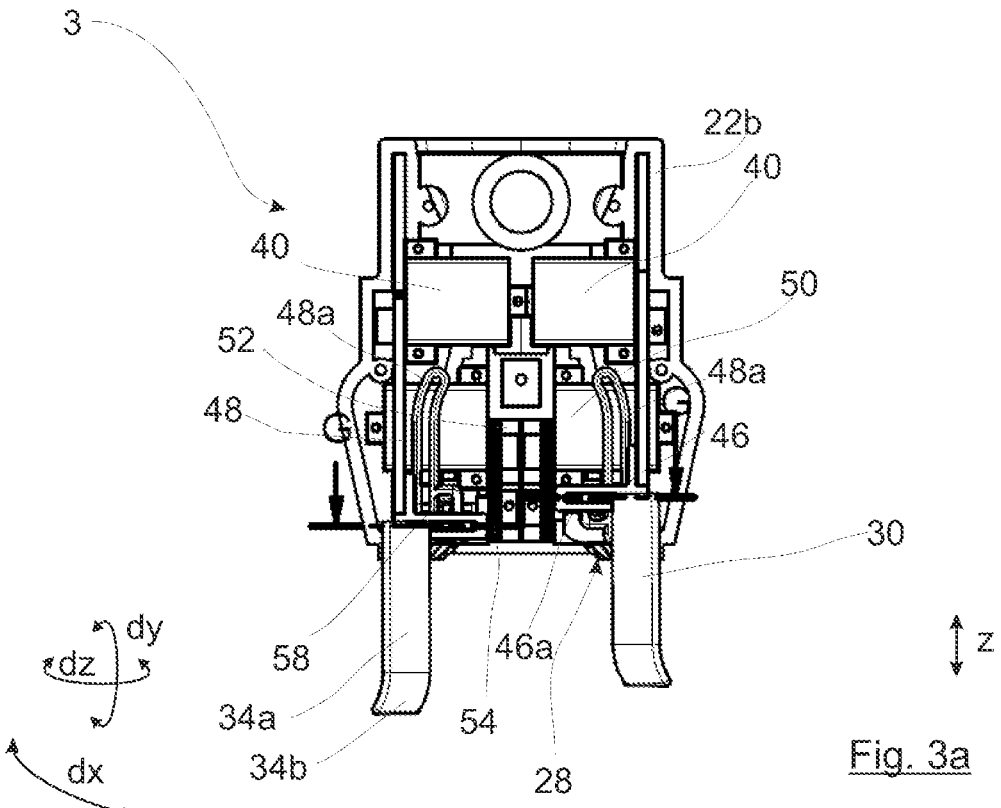
_Fig. 3a_
G-G ( 1 : 2 )
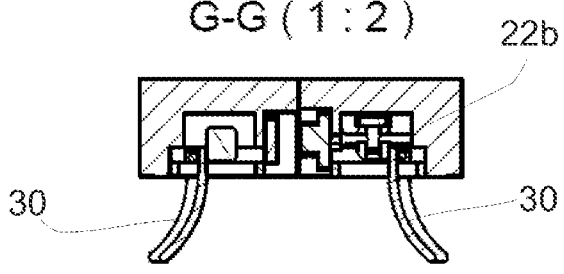
_Fig. 4_

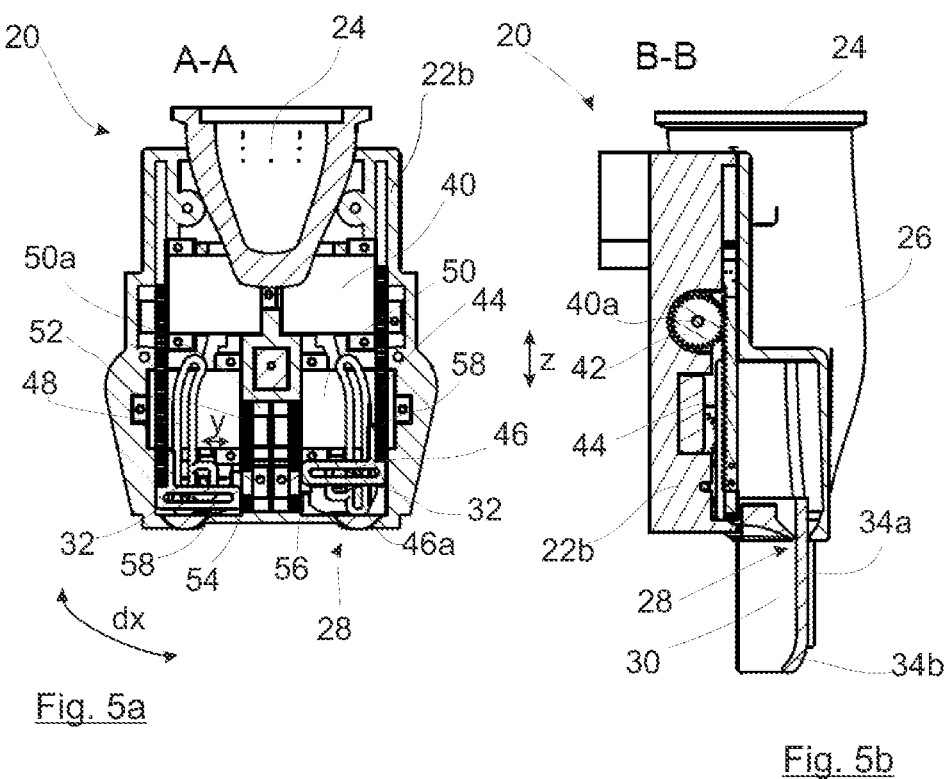
Fig. 5a
Fig. 5b
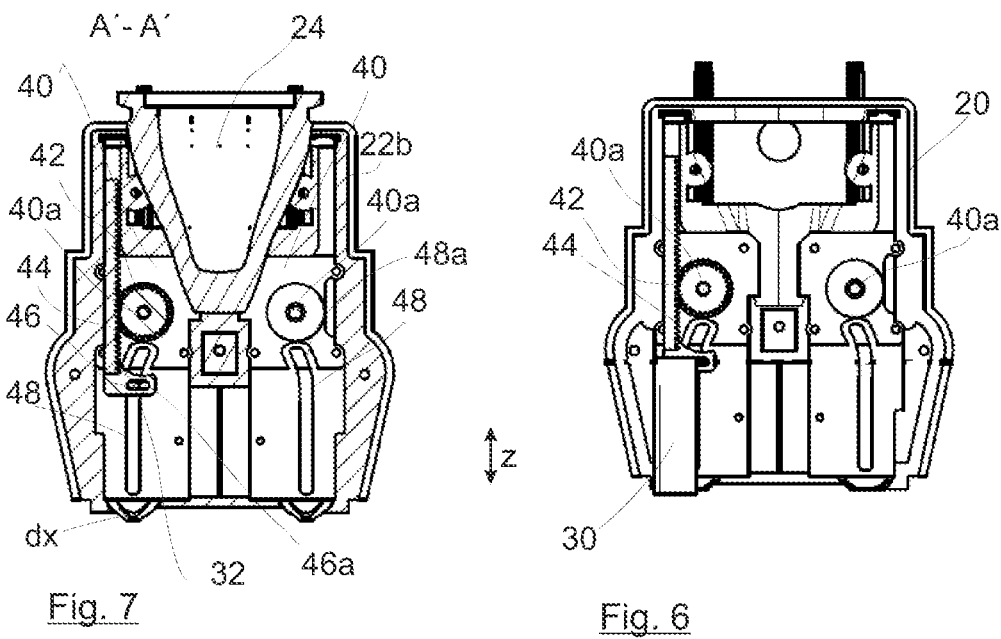
Fig. 7
Fig. 6

DEVICE AND METHOD FOR ADDITIVE MANUFACTURING OF A COMPONENT

CROSS-REFERENCES TO RELATED APPLICATIONS

This application claims priority of German Patent Application No. 102023107845.3 filed Mar. 28, 2023, the entire contents of which are hereby incorporated by reference in this application.

BACKGROUND AND SUMMARY

The invention relates to a device for additive manufacturing of a component, having a material dispensing unit for depositing a building material and an actuator assembly which is designed to move the material dispensing unit over a work surface in order to deposit the building material layer by layer in predetermined print paths.

The invention also relates to a method for additive manufacturing of a component.

Devices and methods for additively manufacturing three-dimensional objects are well-known for producing models, prototypes, tools, and end products, for example. In this case, starting materials or building materials in the form of liquids, powders, or filaments made of thermoplastic plastics are deposited by a print head fastened to an end effector of an actuator assembly in order to build up the object in layers based upon 3D data of the object to be manufactured. Such a method is also referred to, inter alia, as a "generative manufacturing method" or as "3D printing."

In the meantime, it is also known to use additive manufacturing methods for manufacturing entire structures or parts of structures (for example, walls or formwork). The additive manufacturing of components or of entire structures can significantly increase productivity in the construction industry. As a result of so-called "3D concrete printing", structures can be produced faster and at lower costs. With the aid of a 3D concrete printer, concrete structures can be realized quickly and economically, while at the same time having maximum design freedom.

3D concrete printers are regularly provided in the so-called portal design. The material dispensing unit or print head is attached to a crossbeam, which in turn runs between two parallel horizontal beams above a work surface. The print head is movable along the longitudinal axis of the crossbeam, wherein the crossbeam is also able to move back and forth along the longitudinal axis of the horizontal beams. In this way, a horizontal movement parallel to the work surface in the provided print paths is possible. In order to also realize a vertical movement, the horizontal beams are connected in a vertically movable manner to corresponding vertical struts which form a vertical guide rail. Due to the mentioned structure, the print head can move in all three spatial directions and produce building structures additively.

In order to supply the material dispensing unit with the building material to be deposited, a feed line is required, which is generally a flexible hose (hereinafter also referred to as "conveying hose").

In the conventional design without so-called 3D concrete printers, formwork systems are usually used for producing concrete components. The frame formwork elements are arranged relative to one another and fixed in such a way that they form a mold into which a hardenable building material, i.e. an initially liquid and then hardening building material, in most cases concrete, is introduced for the production of a component. After hardening of the building material, the frame formwork elements are generally removed. This known method makes it possible to produce very fine and smooth surfaces of the concrete components in that, for example, the frame formwork elements have a corresponding surface on the formwork skin. However, this conventional design at the same time has the disadvantage that the construction of the formwork system and the subsequent dismantling are complicated and expensive.

In contrast, so-called 3D concrete printing offers the possibility of shaping corresponding components or entire structures without constructing and dismantling an additional formwork system. The construction material is applied in individual layers, wherein, unlike in the conventional design, the resulting lateral surfaces of the components or structures are not completely flat and smooth, but rather may have irregularities that are due to the individual layers applied on one another.

These irregularities, which can appear as small valleys, recesses, or indentations at the interfaces of two layers, for example, should be reduced as far as possible in order to simplify or completely eliminate the need for post-processing of the surfaces.

For this purpose, the prior art proposes using additional smoothing spatulas, trowels, smoothing disks, or the like, which are attached in the area of the material outlet and move with it in order to smooth the applied material laterally during the printing.

For example, publication RU 2 739 244 C2 discloses a device with two lateral spatulas, which also act as electrodes for heating and curing the polystyrene building material, and with an upper pressure spatula for forming a compacted polystyrene layer.

The publication KR 10 1666181 B1 describes an undesirable effect that can occur during 3D concrete printing, namely that the not-yet-cured material flows downwards from subsequent upper layers to the lower printed layers. As a result, the lateral surfaces of the printed components bulge convexly outward in the lower region close to the bottom.

To counter this undesirable effect, publication KR 10 1666181 B1 proposes cutting away the unevenness formed on the lateral surfaces and the laterally protruding material of subsequent layers in the longitudinal direction (and thereby smoothing the lateral surfaces) using two knife spatulas attached to the side of the material dispensing unit, thus preventing run-off to the lower layers. The two knife spatulas are pulled along by the material dispensing unit during the printing. Depending on the state in which the material is to be cut, the cut can be made immediately after printing (for example, by attaching the knife spatulas to the material dispensing unit at the height of the material dispensing unit) or with a time delay (for example, by attaching the knife spatulas to the material dispensing unit below the material dispensing unit).

According to a specific embodiment, it is proposed that the knife spatulas are not designed for cutting, but rather for shaping a specific contour on the lateral surfaces, for example in that they have a curved shape, a V-shape, or the like, so that the cross section of the component formed in layer-by-layer fashion can be brought into different shapes.

Another solution from the prior art is described in CN 111456438 A. A surface-modifying lateral plate is described here, which is attached behind the outlet opening of the material dispensing unit. Viewed in the direction of a printing axis X (longitudinal axis of the linear printing movement), the lateral plate has a first portion parallel to the X-axis, which merges, viewed in the direction of the X-axis, into a second portion angled towards the output opening and then into a third portion angled away from the output opening. This results in a bent surface of the plate, with the bend between the second and third portions protruding towards the applied material layer and smoothing the lateral surfaces of the applied material layer.

EP 1 587 995 B1 and EP 2 610 417 A1 disclose a material dispensing unit with a multi-nozzle arrangement, wherein a first and second smoothing spatula are laterally attached in order to smooth the formed lateral surfaces of the component. According to one embodiment, the height of the two smoothing spatulas can be changed by means of a position control. Furthermore, the lower surface of a holder for one of the nozzles can also function as a smoothing spatula in order to smooth an upper side of the material layer applied by the associated nozzle.

In practice, it has been shown that building material can sometimes adhere to the elements for smoothing the surfaces of a component, which can lead to increased friction and possibly undesired structures in the surface, such as grooves or the like.

From EP 3 626 420 B1, for example, a device for producing three-dimensional concrete elements is known which comprises a spray head with a spray nozzle for spraying concrete material, and two adjustable guide surfaces which are intended to define a predetermined volume for the concrete material to be sprayed on. To counteract the known problem of possible scoring, the publication proposes specific materials for the guide surfaces that are water-repellent and non-adhesive in order to avoid concrete material residues on the guide surfaces.

Finally, KR 10 2439248 B1 discloses a solution in which the material outlet is laterally flanked by two guide surfaces that laterally shape a layer of cement dispensed by the material outlet into a predetermined wall thickness. In order to reduce the friction between the guide surfaces and the cement, a water nozzle having a plurality of micro-openings can be provided in the guide surfaces, for spraying water onto the cement surface to be shaped and smoothed. The sprayed water influences the viscosity of the cement in order to solve the potential problem of cement adhering to the guide surfaces.

Furthermore, according to one embodiment, a recess for an associated forming roller can be provided in each of the guide surfaces, which roller extends at least in portions with its lateral surface through the recess and thereby comes into contact with the cement surface to be shaped. The forming roller has a freely rotatable part and a part that is non-rotatably connected to a forming axle, wherein the associated guide surface is fixedly connected to the non-rotatably connected part of the forming roller.

In one embodiment shown, the forming roller can be adjusted vertically by means of a separate lifting unit, so that the position of the guide surfaces can be adapted to the amount of cement dispensed or the height of a layer.

In one embodiment shown, the forming roller can be attached to a two-part forming axle, wherein the parts can be pivoted relative to each other via a joint in such a way that the angle of incidence of the associated guide surface can be adapted to the structure or shape of the layer.

In one embodiment shown, the forming roller can be adjustable in a horizontal direction by means of a separate drive in such a way that the angle of incidence of the associated guide surface can be adapted to the structure or shape of the layer.

In view of the known prior art, an object of the described embodiments is to provide a device for additive manufacturing of a component with improved surface smoothing. In particular during operation of the device.

The described embodiments are also based on the object of providing a method for additive manufacturing of a component with improved surface smoothing.

A further object of the described embodiments is to enable a change between an operating mode or an application with a supplementary surface smoothing and an operating mode or an application without a supplementary surface smoothing. Particularly without a supplementary surface smoothing, a particularly compact device for additive manufacturing of a component can be provided.

A device for additive manufacturing of a component is provided, preferably a device for additive manufacturing of structures or components of structures on a work surface or a substrate.

The component to be manufactured can in particular be part of a structure or a formwork. The component can also be a complete structure or a complete formwork. In principle, any components can be manufactured additively according to the described embodiments.

In the context of the described embodiments, building structures can be understood as structures of all types, in particular however protective structures such as buildings for the accommodation and stay of humans or animals, protective walls, dikes, shelters, enclosures, weirs and fortification systems, and city walls and prison walls. However, a structure can also be a traffic structure, for example a road, a pedestrian pathway, a bridge or a tunnel. Supply and disposal structures such as wells, sewage treatment plants, dams, chimneys or temporary structures can also be manufactured additively within the scope of the described embodiments.

Within the scope of the described embodiments, a component of a structure can in particular be a functional component of a structure, in particular a functional or geometrically cohesive part of the structure such as a wall, a support, or a stair. A building part consisting of multiple components of the structure (for example a floor or a story of a building) can also fall under the term "component" within the scope of the described embodiments. A formwork or formwork component can also be a component within the scope of the described embodiments, in particular if the formwork component or the formwork subsequently forms a part of the structure, for example the outer part of a wall of the building.

Multiple components can also be manufactured using the proposed device, possibly also components that are not connected to one another.

According to the described embodiments, the device has a material dispensing unit for depositing a building material.

In particular, it can be provided that the material dispensing unit is designed to deposit flowable concrete ("fresh concrete") or mortar or dry mortar as a building material.

Preferably, a concrete formulation with small aggregate is sought. In particular, a concrete can be provided which rapidly sets and in particular has a high green strength. It can also be provided that the concrete has one or more additives, for example in order to prevent excessively rapid drying in order to increase the pumpability and/or to modify the color.

For example, an aggregate of up to 10 mm or more, preferably of up to 6 mm, particularly preferably of up to 4 mm can be provided.

As an alternative to the use of concrete or mortar as a building material, however, any other building material can also be provided which can be suitable for manufacturing or building structures or components thereof, in particular polymer concrete, gypsum, clay, a plastic, preferably a thermoplastic, but also metals or alloys. In principle, any building materials can be provided within the scope of the described embodiments.

In principle, the component can be produced from one, two, three, four or even more starting materials or building materials. For example, various concrete mixtures, plastics, metals and/or alloys can be combined with one another as desired.

The material output unit can be designed to dispense the building material in a defined form, for example in print paths with rectangular or round edges. In cross section, the individual print paths can be, for example, discharged rectangular (square or elongated), round or oval. The material output unit preferably outputs the building material in the provided wall thickness of the component to be printed.

The first surface of one or more layers of building material deposited by the material dispensing unit can, in particular, have one of the two surfaces laterally delimiting the wall thickness.

The device comprises an actuator assembly which is designed to move the material dispensing unit over a work surface in order to deposit the building material layer by layer in predetermined print paths.

The work surface can be a substrate—in the context of the described embodiments, in particular a subsoil and/or a foundation on which the component or structure is erected. However, the work surface according to the described embodiments can also be a floor of a multi-story building or a mobile, movable work surface. For example, it can be provided to transport the structure together with the work surface or substrate to its intended installation site after the additive manufacturing. In principle, any surface on which the structure can be erected (permanently or temporarily) can be suitable as a work surface within the scope of the described embodiments.

The material dispensing unit has a dispensing opening in order to dispense the building material. The dispensing opening can have different geometries that determine how the building material is deposited, for example with a round cross-section or a rectangular cross-section.

The print path along which the material dispensing unit deposits the building material can be calculated on the basis of 3D data of the component.

Corresponding method steps are known. The 3D data of the component can in particular be three-dimensional CAD data. The component can be represented in the data in particular by point clouds, edge models, surface models and/or volume models.

A control device can be provided which controls and/or regulates the method or individual method steps of the device.

For example, the control device can be configured to calculate the print pathway on the basis of the input 3D data. The control device can be configured, for example, to calculate a virtual model of the component in the known STL format ("standard triangulation/tessellation language" format) or STEP format ("standard for the exchange of product model data" format) from the 3D data of the component. In the context of the STL format, the component data can be described with the aid of triangular facets. The principle is known and will therefore not be described in more detail.

An STL interface is a standard interface of many CAD systems. In the present case, the control device can be configured to first calculate STL data for further processing from any 3D CAD data. However, the control device can also be configured to record and further process 3D data in the STL format. In principle, any other data format can also be provided.

Regardless of whether the STL data were generated by the control device itself or only transmitted to it, the control device can be configured to convert the component data into printer data for 3D printing (or for additive manufacturing) using the STL data (or using other 3D data). For this purpose, it can be provided, inter alia, to convert the 3D data or STL data into individual layers to be printed (so-called "slicing"), after which the print paths are calculated for the individual layers in order to predetermine the movements of the material output unit.

The control device can be configured to control the material dispensing unit as a function of the print paths and/or to regulate the discharging or deposition of the building material.

The actuator assembly mentioned above can be configured to move the material dispensing unit relative to the work surface—in particular, above or over the work surface, and preferably parallel and/or orthogonally to the work surface. The actuator assembly can also be configured to move the material dispensing unit vertically relative to the work surface, i.e. to determine the height of the material dispensing unit relative to the work surface. Finally, the actuator assembly can ensure a horizontal and/or vertical movement of the material dispensing unit by moving the material dispensing unit along correspondingly oriented guides (in particular the horizontal guides mentioned below and the vertical guide).

Insofar as the described embodiments refer to a "vertical" or "horizontal" direction, the vertical direction is to be understood in relation to the perpendicular to the substrate or to the work surface, and the horizontal direction at right angles thereto, subject to angular deviations that result from tolerances or practical conditions of use and that do not impair the execution of the method in a disruptive manner.

For the movement of the material dispensing unit by means of the actuator assembly, an actuator or a plurality of actuators can be provided which can be controlled accordingly, for example, by the already mentioned control device individually or in groups. Manual actuation up to a purely manual initiation of movement can also be provided-if necessary, in this case, it is even possible to dispense with actuators, wherein the actuators can also be designed to support the manually/mechanically initiated movement.

In particular, the actuator assembly has at least a first horizontal guide and a second horizontal guide for the movement of the material dispensing unit. The second horizontal guide has at least one end portion (in particular at least one end) via which it is connected to the first horizontal guide. The second horizontal guide can be moved along the first horizontal guide.

In a development, it can be provided that the material dispensing unit can be moved transversely to the first horizontal guide along the second horizontal guide.

The material dispensing unit can advantageously be moved in at least two translational degrees of freedom in order to discharge the building material. Through the possibility of movement along two translational degrees of freedom, for example a straight-running wall of a structure can be manufactured additively or layer by layer.

The material dispensing unit can be movable directly or immediately along the first and/or second horizontal guide, for example in the manner of a carriage or a trolley that runs along the corresponding horizontal guide. However, the material dispensing unit can also be moved indirectly or in mediated fashion along the corresponding horizontal guide, for example by moving it directly along any other guide, which in turn is fastened to the corresponding horizontal guide in a directly or indirectly movable manner. For example, the second horizontal guide can be moved directly along the first horizontal guide, to which the material dispensing unit is indirectly or directly fastened (e.g. in the manner of a carriage or a trolley), so that the movement of the second horizontal guide along the first horizontal guide moves the material dispensing unit along the first horizontal guide, as it were.

Furthermore, the device can have a feed position for a flexible feed line, which can be connected to the material dispensing unit, for the building material. The flexible feed line can be, for example, a conveying hose for the building material or can be the building material in fibrous form (in particular as a filament).

The actuator assembly for moving the material dispensing unit can have a vertical guide along which the material dispensing unit can be moved vertically to the work surface (directly or indirectly, for example via a movement of the first horizontal guide).

It is conceivable for the material dispensing unit to be moved in at least two translational degrees of freedom in order to discharge the building material. Through the possibility of movement along two translational degrees of freedom, for example a straight-running wall of a structure can be manufactured additively or layer by layer.

However, it can preferably be provided that the material dispensing unit can be moved in all three translational degrees of freedom in order to discharge the building material. In particular, a material dispensing unit movable along all translational degrees of freedom enables a flexible manufacture of any desired three-dimensional structures on the work surface.

Preferably, the material dispensing unit is moved in at least four degrees of freedom, in particular in all three translational degrees of freedom and at least one rotational degree of freedom. Particularly preferably, a movement along five degrees of freedom (preferably all three translational degrees of freedom and at least two rotational degrees of freedom) and very particularly preferably along all six degrees of freedom can be provided.

In particular if the material output unit is movable in all translational degrees of freedom and in addition in one or more rotational degrees of freedom, the individual print paths can be deposited with the greatest flexibility. In this way, the geometry of the structure or of the component can be predetermined in nearly any manner desired.

For example, a tilting of the material output unit and/or a rotation of the material output unit can be provided during the deposition of the building material.

It can be provided that the material dispensing unit be fastened to an end effector of the actuator assembly and be moved along the print path by the actuator assembly. Preferably, here the end effector is designed as a trolley of an actuator assembly designed as a gantry crane unit and can be moved vertically along the vertical guide (preferably indirectly, by moving the horizontal guide(s) along the vertical guide). Such a system is also known under the term "portal printer".

It should be mentioned at this point that the actuator assembly can also be a robot or robot arm, in particular an industrial robot. For example, a six-axis robot or another movement system, e.g., a hexapod or a five-axis system, or a combination of several movement units can be provided in order to move the material dispensing unit horizontally and/or vertically. Pivotable and/or telescopically extendable movement units and/or cable systems can also be provided for forming the actuator assembly. In these embodiments as well, a guiding of the feed line on the axes can also be extremely advantageous.

The specific design of the device is not necessarily important within the scope of the described embodiments.

The features according to the described embodiments can advantageously be retrofitted in an existing device. For example, an existing 3D concrete printer can continue to be used and retrofitted with at least one guide leg described below and a corresponding actuator system as well as a cleaning assembly in order to optimize the surface quality of at least a first surface of the component as required.

According to the described embodiments, at least one first guide leg can be provided which is designed to shape a first surface of one or more building material layers deposited by the material dispensing unit. Here the at least one guide leg can in particular also be used to laterally stabilize and/or impart the shape to the building material during the discharging. Furthermore, the term "shaping" here also includes in particular the smoothing or other removal of undesirable surface structures on the formed lateral surface of the component.

The described embodiments are described below with a first and optionally a second guide leg, each of which can laterally shape the deposited one or more layers of building material. Of course, however, a plurality of first guide legs and possibly a plurality of second guide legs can also be provided, which interact to shape a first surface and possibly a second surface. In addition to the at least one first guide leg and an optional at least one second guide leg, further guide legs or structures can also be provided, which can be movable relative to the material dispensing unit by means of an actuator system or can be rigidly attached to the material dispensing unit for the shaping of a surface of the one or more layers of building material.

The building material is deposited layer by layer, wherein the layers applied additively on top of one another are connected to one another and form a component with lateral surfaces. As already stated at the outset, in particular the lateral surfaces of the resulting component can show unevenness. Accordingly, the first guide leg serves to reduce such unevenness by shaping a first surface, in particular by smoothing the first surface in the manner of a spatula or removing unwanted protrusions on the first surface in the manner of a blade.

The first surface can in particular be a substantially vertically extending surface of one or more deposited building material layers applied on top of one another in the vertical direction. Depending on the dimensions and positioning of the at least one first guide leg, this leg can extend along the height of a single layer of building material or plurality of layers of building material and accordingly shape a first surface of a deposited layer of building material or a first surface of a plurality of deposited layers of building material.

If the layers are applied directly on top of each other in a vertical direction, a component (or structure) is formed with lateral surfaces (in the case of a wall, for example, the wall surfaces) that extend substantially in the vertical direction, i.e. perpendicular to the work surface.

Furthermore, according to the described embodiments the at least one first guide leg can be moved, driven by an actuator, in at least one translational degree of freedom and/or rotational degree of freedom relative to the material dispensing unit, i.e. the at least one first guide leg can be moved directly or indirectly in at least one direction of movement by an actuator.

The movement in at least one degree of freedom of translation can, for example, be a movement in the vertical direction or in the horizontal direction, and the movement in at least one degree of freedom of rotation can, for example, be a rotating or pivoting movement about a horizontal or vertical axis of rotation.

A guide leg here is a component which, in the manner of a smoothing spatula, has at least one guide portion which can be in shaping, in particular smoothing, contact with the surface to be shaped. In addition to a spatula-shaped component, a guide leg can also have a guide roller for shaping and smoothing a surface.

The actuator-driven movement of a first guide leg relative to the material dispensing unit according to the described embodiments here comprises any kind of positioning and orientation of the guide leg relative to the material dispensing unit. However, this does not mean, for example, a rotation of a guide leg designed as a guide roller about a central longitudinal axis of the guide roller, as disclosed for example in KR 10-2439248 B1 with regard to the forming rollers accommodated in the guide plates. Such a rotation about its own axis does not represent a change in the position or orientation of the guide leg relative to the material dispensing unit in the sense of the described embodiments, but rather at most a movement of the guide portion (when the lateral surface rotates).

The actuator-driven displacement or translational movement, and thus the change of position or orientation according to the described embodiments, of the at least one first guide leg relative to the material dispensing unit in at least one translational degree of freedom comprises, for example, a movement of the at least one first guide leg in the vertical direction or in the horizontal direction.

In particular, a movement in the vertical direction is particularly advantageous, i.e. if for example the relative position of the guide leg with respect to the height (in the z-direction) relative to the material dispensing unit is changed. Thus, by moving in the vertical direction the position of the guide leg can be adapted for example to the layer height of a layer of building material or, as explained in more detail below in connection with a second aspect of the described embodiments, the driven guide leg can be moved from a working position to a rest position in which it is no longer used to shape a surface of the component.

Here the movement in the vertical direction in the sense of the described embodiments can also deviate from the direction of a perpendicular to the work surface. What is decisive is that when the guide leg moves "in the vertical direction," a movement takes place that is predominantly in the vertical direction, i.e. in the direction toward and away from the work surface.

Accordingly, a movement in a horizontal direction is not necessarily a movement perpendicular to a perpendicular to the work surface. Instead, this refers to a movement along an axis parallel to the print path or in a plane with an axis parallel to the print path. In particular, a movement of the at least one guide leg in the horizontal direction toward the axis parallel to the print path or away from this axis makes it possible to adapt the wall thickness of a printed wall (as a component).

The pivoting or rotational movement, driven by the actuator, of the at least one first guide leg relative to the material dispensing unit in at least rotational one degree of freedom can comprise a pivoting movement of the at least one first guide leg about an axis of rotation which extends in the horizontal direction and in particular parallel to the print path or which extends in the vertical direction.

In particular, a movement about an axis of rotation that extends parallel to the print path is advantageous in order to achieve an angle of incidence of the at least one first guide leg to a perpendicular to the work surface which allows a smoothing of a surface with an overhang, for example.

Such an angle of incidence can be defined, for example, by a guide plane of the guide leg which encloses, with a perpendicular to the work surface, an angle of incidence of from 0 degrees (for a wall to be smoothed with a vertical wall surface to be shaped) up to 180 degrees.

In order to counter the known problem described at the outset of an impairment of the surface quality due to building material residues adhering to the guide leg, in particular if the guide leg is to be temporarily brought into a rest position in which it is not used for shaping the surface and building material residues could dry on its surface, according to a first aspect of the described embodiments the device furthermore has a cleaning assembly with at least one cleaning portion associated with the at least one first guide leg. Of course, a plurality of cleaning portions can also be associated with the at least one first guide leg or more than one first guide leg.

The at least one cleaning portion is arranged in such a way that, at least in a position of the at least one first guide leg relative to the material dispensing unit, in particular in the event of a relative movement of the at least one first guide leg relative to the material dispensing unit, it rests against or comes to rest against the associated guide leg at least in portions. In this way, the at least one first guide leg can strip off any adhering building material residues on the cleaning portion during its relative movement relative to the material dispensing unit.

A cleaning of the guide leg is thereby achieved with the aid of a passive cleaning portion, whereby a particularly simple and cost-effective cleaning of the shaping surface of the guide leg and thus a reduced formation of scoring can be provided during the shaping of a lateral surface of the applied building material layer(s).

Of course, the cleaning assembly can alternatively or additionally have an active cleaning element or an active cleaning portion, which can be brought into contact with the at least one first guide leg by means of an additional actuator. However, this increases the complexity of the device and thus its cost.

In contrast, it is particularly advantageous that the guide leg, which can be moved by means of an actuator, can use the actuator already provided in order to carry out cleaning in addition to adjusting its position relative to the material dispensing unit.

The at least one cleaning portion can be arranged in such a way that it rests against the associated guide leg in each position (that is possible within the scope of its driven movement) of the associated guide leg relative to the material dispensing unit, or only in at least one or more specific positions of the associated guide leg relative to the material dispensing unit, for example within a particular movement range of the guide leg.

Furthermore, the cleaning portion may contact the associated guide leg only in portions, so that only a particular region of the adjacent guide leg can be cleaned, for example a central guide region of the guide leg, or so that only a certain region of the cleaning portion comes into contact with the associated guide leg.

Residues of building material, i.e. adhering printing material, on the at least one first guide leg and/or on an optionally provided at least one second guide leg can dry out, in particular if the guide leg or legs are not used for shaping a surface for a while (i.e. are brought into the rest position), and can lead to grooves or unevenness on the surface to be shaped the next time the guide leg or legs are used for shaping and stabilizing a surface. This problem is addressed by the solution according to the first aspect of the described embodiments by the cleaning assembly according to the described embodiments.

According to a second aspect of the described embodiments, for a particularly compact design of the device and a simple change between a working position of the guide leg and a rest position, a device for the additive manufacturing of a component is proposed.

Compared to the prior art, this has the advantage that it does not require manual disassembly of the guide leg or guide legs, as shown for example in KR 10 1666181 B1. The device for additive manufacturing of a component has a material dispensing unit for depositing a building material, and an actuator assembly which is designed to move the material dispensing unit over a work surface in order to deposit the building material layer by layer in predetermined print paths, as well as at least one first guide leg which is designed to shape a first surface of the one or more layers of building material deposited by the material dispensing unit in a working position of the at least one first guide leg, wherein the at least one first guide leg can be moved, driven by a first actuator, in at least one degree of freedom, in particular in a translational degree of freedom, relative to the material dispensing unit.

The material dispensing unit has a housing, wherein the at least one first guide leg can be moved, driven by a first actuator, from a working position, in which the at least one first guide leg is able to shape the first surface, into a rest position in which the at least one first guide leg can be accommodated at least in portions, preferably predominantly, for example almost completely, in the housing of the material dispensing unit.

The statements above and in the following regarding design variants of the described embodiments according to the first aspect also apply to the realization of the described embodiments according to the second aspect, where applicable. In addition, a combination of these two aspects is of course also possible and advantageous.

In this way, the change in position and/or orientation of the at least one first guide leg relative to the material dispensing unit into a rest position can at the same time be used to enable stripping on the cleaning portion through contacting it. Alternatively or additionally, it would also be possible for the cleaning portion to be moved relative to the at least one first and/or the at least one second guide leg by means of an actuator in order to allow a corresponding relative stripping movement (active cleaning portion).

According to the second aspect of the described embodiments, for example a driven translational displacement possibility of the at least one first (and/or at least one optional second guide leg) in, for example, the vertical direction can be sufficient to displace it from a working position, in which the at least one first guide leg (and/or the at least one second guide leg) can shape at least one first (and/or second) surface, into the rest position, in which it is accommodated, protected at least in portions, within the housing.

Furthermore, the material dispensing unit can be kept particularly compact, for example for transportation to another construction site, by retracting the guide leg or legs into the interior of the housing through the at least one receiving opening. The guide leg or legs are well protected in the housing, which prevents or at least reduces the risk of unwanted deformation during transport, or damage to the guide leg or legs.

In the case of a plurality of guide legs, each guide leg can be associated with its own receiving opening on the housing, through which it can be moved into the interior of the housing, or a common receiving opening can be provided for a plurality of guide legs.

The adjustability of the guide leg or the guide legs into a rest position inside the housing can thus also be used for cleaning the guide leg or the guide legs, irrespective of whether this is disclosed in the context of the first aspect of the described embodiments or in the context of the second aspect of the described embodiments, as will be further explained below in the context of the figure description of a specific example.

The housing of the material dispensing unit can be designed in one part or multiple parts, wherein in particular different parts or regions can be associated with different functional elements. For example, a housing part or housing region can be assigned to the material dispensing unit for receiving and dispensing the building material and can bear the geometry for dispensing the building material. A further housing part can be designed for receiving or attaching for example electronic or motor elements, in particular for receiving the at least one actuator.

The at least one receiving opening of the housing can be formed on only one housing part or housing region or on a plurality of adjacent housing parts.

According to a conceivable development of the described embodiments (both according to the first aspect and according to the second aspect), the at least one first guide leg is also driven by one or more further actuators and can be displaced and/or pivoted relative to the material dispensing unit in at least one further degree of freedom.

However, with the device according to the described embodiments, the individual layers can, for example, also be applied on top of one another with a slight offset relative to one another in such a way that, for example, a surface results which is substantially curved viewed in the vertical direction, for example in the manner of an overhang.

In the case of such an overhang (a surface that is curved viewed in the vertical direction) of the deposited layers of building material, the at least one first guide leg can, for example, be inclined at an angle of incidence relative to a perpendicular to the work surface (relative to the vertical direction), i.e. can be set at an angle to the vertical direction. This positioning of the guide leg can be effected, for example, by a first actuator which is able to displace the at least one first guide leg vertically relative to the material outlet, and by means of a second actuator which is capable of pivoting the at least one first guide leg relative to the material outlet. The pivoting can take place for example about an axis of rotation which runs substantially horizontally, for example parallel to the print path.

In a corresponding development of the described embodiments, the at least one first guide leg can thus be moved, with the aid of an actuator, not only in a translational direction of movement, for example vertically upwards and downwards; rather, it is also possible to pivot the at least one first guide leg relative to the material dispensing unit by means of an actuator.

In this way, a continuous and automated adjustment of the at least one first guide leg in a translational and also a rotational direction of movement can take place, whereby not only a purely vertically aligned first surface of a straight component can be shaped with the aid of the at least one first guide leg, but, for example, the shaping of a bulged or curved surface is also possible.

The provision of one or more actuators for moving the at least one first guide leg allows an incremental or even stepless adaptation of the relative position of the at least one first guide leg relative to the material outlet in a translational degree of freedom and/or in a rotational degree of freedom.

As will be explained in more detail below, the automated adjustment by means of one or more actuators also allows the relative position of the at least one first guide leg to be controlled with the aid of a control device or control unit. In particular, the control device which also controls and/or regulates the printing process or individual method steps of the device can also be used for the controlling.

In principle, it is conceivable that the at least one first guide leg can be moved by a single actuator in multiple degrees of freedom, for example in a translational degree of freedom and in a rotational degree of freedom, relative to the material dispensing unit. However, by providing two or more actuators that can be operated independently of one another, it is also possible to effect an individual adjustment of the at least one first guide leg relative to the material dispensing unit in one of the multiple degrees of freedom, which can be advantageous. In addition, it is also possible to activate the individual actuators simultaneously, whereby a simultaneous adjustment of the at least one first guide leg relative to the material dispensing unit can be effected in several degrees of freedom.

Furthermore, the device can have at least one second guide leg for shaping a second surface of the deposited one or more building material layers, which guide leg, driven by an actuator, is movable relative to the material dispensing unit at least in one translational degree of freedom and/or rotational degree of freedom.

The cleaning assembly can in particular have a cleaning portion associated with the at least one second guide leg, wherein in at least one relative position of the at least one second guide leg relative to the material dispensing unit, the cleaning portion is arranged at least in portions in cleaning contact with the associated guide leg, in such a way that during a movement relative to the material dispensing unit, the at least one second guide leg is capable of stripping off building material residues on the contacted cleaning portion.

The above explanations relating to the at least one first guide leg also apply to the at least one second guide leg. This also applies in particular to the statements relating to the associated cleaning portion.

As indicated above, in the case where a second guide leg is provided the cleaning can also have a plurality of cleaning portions, of which one or a first number can be associated with the first guide leg and another, or a second number, with the second guide leg.

Alternatively, a single cleaning portion can also be provided, which is arranged in such a way that, in at least one relative position of the at least one first guide leg and the at least one second guide leg relative to the material dispensing unit, the portion is arranged at least in portions in cleaning contact with the at least one first guide leg and the at least one second guide leg, in such a way that these are able to strip off building material residues on the contacted cleaning portion when there is a movement relative to the material dispensing unit.

In particular, it can be provided that the at least one first guide leg and the at least one second guide leg can be adjusted in the same translational degree of freedom and/or in the same rotational degree of freedom; for example, both are displaceable in a substantially vertical direction and, for example, can each be pivoted about an axis of rotation, where the axes of rotation are arranged substantially parallel to one another.

In this way, it is possible to adjust the two guide legs simultaneously and symmetrically relative to the material dispensing unit if desired. The first and the second surface, which are shaped by the at least one first guide leg and by the at least one second guide leg, can accordingly run in particular parallel to one another or can laterally delimit a wall thickness which remains substantially constant.

Accordingly, it is also possible to move the at least one first guide leg and the at least one second guide leg by a common actuator in at least one degree of freedom. In this solution, in particular a coupling assembly can be provided, by means of which at least one of the at least one first guide leg and the at least one second guide leg is connected to the driving actuator.

However, by providing one or more further actuators for adjusting the at least one first and/or second guide leg, the at least one first guide leg and the at least one second guide leg can also be displaced and/or pivoted individually and independently of one another and can thus be adjusted relative to the material dispensing unit.

A solution with at least one coupling assembly has the advantage that fewer actuators, in particular only one actuator per degree of freedom, need to be provided in order to be able to move the guide legs simultaneously in a translational degree of freedom and/or in a rotational degree of freedom relative to the material dispensing unit.

However, a solution with actuators that can be operated independently of one another and which are associated with the corresponding guide legs offers the advantage that the guide legs, in particular the at least one first guide leg and the at least one second guide leg, can each be moved in a degree of translational freedom and/or in a rotational degree of freedom relative to the material dispensing unit individually and independently of one another.

In order to provide even greater flexibility and further adjustment options if necessary, according to a development of the described embodiments it can be provided that the at least one first and/or the at least one second guide leg, driven by one or more further actuators, can be displaced relative to the material dispensing unit at least in one further translational degree of freedom and/or can be pivoted relative to the material dispensing unit in a further rotational degree of freedom.

Thus, for example in addition to a possibility of vertical adjustment, a possibility of horizontal adjustment by means of an actuator or a pivotability about a further axis of rotation can also be advantageous in order to shape surfaces with more complex contours with the aid of the at least one first guide leg and/or the at least one second guide leg.

With regard to the further advantages that result from the use of one or more further actuators, reference is made to the above statements regarding actuators.

Alternatively or additionally, it can be provided that the device has a control unit which is configured to control at least one of the actuators for moving the at least one first guide leg and/or the at least one second guide leg.

Such a control unit can, for example, also comprise a control unit which is designed and arranged separately from the device and is suitable for controlling the at least one actuator for moving the at least one first guide leg and/or the at least one second guide leg in a wired or wireless manner, for example in the manner of a remote control.

According to a development of the described embodiments, the device can furthermore have at least one control device which is configured to control the actuator assembly for moving the material dispensing unit over the work surface.

As stated above, the control device can be configured to calculate the print path on the basis of the input 3D data. The control device can be configured, for example, to calculate a virtual model of the component in the known STL format ("standard triangulation/tessellation language" format) or STEP format ("standard for the exchange of product model data" format) from the 3D data of the component. In the context of the STL format, the component data can be described with the aid of triangular facets. The principle is known and will therefore not be described in more detail.

An STL interface is a standard interface of many CAD systems. In the present case, the control device can be configured to first calculate STL data for further processing from any 3D CAD data. However, the control device can also be configured to record and further process 3D data in the STL format. In principle, any other data format can also be provided.

Regardless of whether the STL data were generated by the control device itself or only transmitted to it, the control device can be configured to convert the component data into printer data for 3D printing (or for additive manufacturing) using the STL data (or using other 3D data). For this purpose, it can be provided, inter alia, to convert the 3D data or STL data into individual layers to be printed (so-called "slicing"), after which the print paths are calculated for the individual layers in order to predetermine the movements of the material output unit.

The control device can in addition be configured to control the material dispensing unit depending on the print paths and/or to regulate the discharging or depositing of the building material.

This control device can furthermore comprise the at least one control unit for controlling the actuators for moving the at least one first and/or at least one second guide leg. In this embodiment, the control device of the device is thus also used to control at least one or more of the actuators for adjusting the at least one first guide leg and/or the at least one second guide leg relative to the material dispensing unit. For example, depending on the architecture of the wall of the component and thus on the basis of the associated 3D data, the guide leg can thereby be adjusted accordingly, i.e. for example in its height (by a controlled vertical translational movement) and/or with regard to its angle of incidence (by a controlled pivoting movement about a horizontal axis of rotation parallel to the print path), in order to adapt the desired appearance of the component, in particular the wall, according to the 3D data.

In the present case, this can be achieved for each so-called slice, i.e. for each layer that is printed. Furthermore, if a change in the position of the at least one first guide leg and/or of the at least one second guide leg relative to the material dispensing unit within a layer is necessary, this can also be brought about by controlling the at least one of the actuators.

Alternatively, an additional control unit can of course also be provided for controlling at least one or more of the actuators for displacing the at least one first guide leg and/or the at least one second guide leg relative to the material dispensing unit, if this is desired. For the conceivable design of an additional control unit, reference is also made to the above statements relating to possible designs of a control unit and to a control device. In particular, it can also be provided that the control device and the control unit are in communicative connection with one another.

In the present case, the material dispensing unit can have a housing with at least one receiving opening.

As already explained in connection with the second aspect of the described embodiments, the housing can be designed in one or more parts, wherein in particular different parts can be associated with different functional elements. For example, a housing part of the material dispensing unit can bear the geometry for receiving and dispensing the building material. A further housing part can be designed to receive, for example, electronic or motor elements, in particular for receiving the at least one actuator.

To shape a surface, the at least one first guide leg and/or the at least one second guide leg can optionally protrude at least in portions from the interior of the housing through the at least one receiving opening in a working position in which the at least one first guide leg and/or the at least one second guide leg are capable of shaping a first and/or second surface. This also includes solutions in which the at least one first guide leg and/or the at least one second guide leg are completely extended out of the housing, i.e. no portion of the guide leg is accommodated in the housing.

Furthermore, the at least one first guide leg and/or the at least one second guide leg can optionally protrude at least in portions into the interior of the housing through the at least one receiving opening in a working position in which the at least one first guide leg and/or the at least one second guide leg are capable of shaping a first and/or second surface. This allows a broader range of applications, since the upward displacement of the guide legs in the vertical direction is not obstructed by the underside of the material dispensing unit, in particular by parts of the housing, as in the prior art.

Alternatively or additionally, in a rest position in which the at least one first guide leg and/or the at least one second guide leg are not capable of shaping a first and/or second surface, the at least one first guide leg and/or the at least one second guide leg can optionally protrude at least in portions, preferably at least predominantly, for example almost completely, into the interior of the housing through the at least one receiving opening.

The advantages of such a rest position have already been extensively described in the context of the second aspect of the described embodiments. In this way, it is possible to switch between an application in which shaping and stabilization of the applied layer of building material is desired and an application in which shaping and stabilization of the dispensed layer of building material is not required or desired, without the need for manual disassembly of the guide leg or guide legs. In addition, the further design of the cleaning assembly means that the guide leg or legs can also be cleaned immediately when they are moved into the rest position.

Alternatively or additionally, at least one of the actuators for moving the at least one first guide leg and/or the at least one second guide leg relative to the material dispensing unit can be accommodated in the housing. Accordingly, a direct or indirect mechanical connection of the at least one first guide leg and/or the at least one second guide leg to the at least one actuator accommodated within the housing can be provided through the at least one receiving opening.

Of course, however, it is also conceivable to attach the actuators outside the housing if desired.

By providing a housing, a protected receiving space for the component(s) accommodated therein is provided. This is particularly advantageous with regard to any collisions in the work area and the associated resulting damage. This also makes it easier to transport the material dispensing unit. Furthermore, components accommodated therein, such as for example the actuators or the guide limbs in their rest position, can also be protected against contamination and further external influences in the construction site region by being accommodated in the housing, which has a positive effect on their service life.

At least one or more of the actuators can have a motorized drive, in particular a servomotor, a closed-loop motor, a stepper motor, or the like, which is suitable for returning its current position to a control unit or control device. When realized as a servo motor, this motor can also be accommodated in the housing due to its comparatively flat design without significantly increasing the external dimensions of the material dispensing unit. This is also a considerable advantage in connection with a 3D concrete printer, since the material dispensing unit should take up as little installation space as necessary, if possible. In order in particular to also be able to print filigree structures, good accessibility of the material dispensing unit should be ensured even in narrow processing regions, which can be achieved, for example, by a slim housing.

The actuators can furthermore be connected to the at least one first guide leg and possibly to the at least one second guide leg via at least one transmission and connection structure in order to transmit a drive movement of the actuator, for example of a driven shaft of a motorized drive, to an associated connected guide leg in order to move it.

The at least one transmission and/or connection structure can in particular comprise a toothed rack, drive rod, control rod, and/or spindle, which is connected directly or indirectly to the at least one first guide leg and/or to the at least one second guide leg. A direct connection can be made without there being at least one driver element connected in between, and an indirect connection can have at least one driver element connected in between.

Furthermore, the transmission of a drive movement from an actuator can be transmitted directly to the connected at least one first guide leg and/or the at least one second guide leg, i.e. without conversion and possible gear ratio transmission. Alternatively, however, it can also be desirable, for example, for a rotating drive movement of an actuator to be transmitted, converted into a translational movement, to the connected at least one first guide leg and/or the at least one second guide leg. In the same way, a gear transmission, for example, of a drive torque may also be expedient.

For example, a toothed rack can engage with a toothed wheel driven by a servomotor and, as a result of the rotary movement of the output shaft of the servomotor, translationally displace a guide leg directly or indirectly connected to the toothed rack (toothed rack drive). Furthermore, a transmission structure in the form of a worm gear can also convert a rotary movement of an output shaft into a translational movement or, in combination with a bearing point, into a pivoting movement and transmit it to a directly or indirectly connected guide leg.

Finally, the device can have within the housing additional guide structures or guide structures integrally formed on the housing for guiding a movement of the at least one first guide leg and/or the at least one second guide leg, for example a guide connecting rod.

The cleaning portion can furthermore be attached to the material dispensing unit. In a design of the material dispensing unit with a housing (according to both the first and the second aspect of the described embodiments), the cleaning portion can be arranged on the housing, in particular on or in the region of the at least one receiving opening of the housing. The cleaning portion can have a projection or edge, for example.

As already mentioned, non-use of the guide leg(s) in particular leads to the potential drying of adhering print material and the formation of undesirable building material residues.

If the cleaning portion is arranged in the region of the receiving opening of the housing that has to be passed through anyway in order to assume the rest position, the cleaning process advantageously takes place whenever a cleaning is required to prevent the formation of undesired building material residues.

The cleaning portion can have a separate component attached to the material dispensing unit, for example a component with a projection or an edge. Alternatively, the cleaning portion can also be formed integrally with the material dispensing unit, in particular with a housing of the material dispensing unit, for example as an integrally formed projection or edge in the region of the at least one receiving opening.

The projection or the edge of the cleaning portion can have a contact contour. Furthermore, the cleaning portion can form a negative shape relative to the contour of the associated guide leg at least in the contact area of the guide leg on the associated cleaning portion. In particular, if the guide leg is not designed as a flat element but rather has for example a curved cross-sectional contour, such a negative shape in the contact area with the guide leg is advantageous.

For efficient cleaning, it is provided that the contact contour of the cleaning portion is able to span the associated guide leg at least in a direction transverse to the relative movement of this guide leg. The direction transverse to the relative movement of the associated guide leg also includes a horizontal direction, particularly in the case of a movement in a substantially vertical direction. In this way, a particularly thorough cleaning of the guide leg can be achieved.

The term "contact contour" refers in particular to the contour of the cleaning portion (viewed in cross section) that can come into contact with the guide leg.

According to one embodiment, the guide leg has two substantially opposite sides, a first upper side and a second upper side, wherein one upper side can regularly be brought into smoothing contact with a surface of the component. Nonetheless, deposited building material can accumulate on both sides and influence the shaping process with the guide leg.

To counter this problem, the cleaning portion can also have a circumferential contact contour, in particular if it is arranged at the receiving opening of the housing. In this embodiment, the cleaning portion can clean the guide leg from all sides with its contact contour.

Alternatively, the cleaning portion can also have a contact contour that is able to contact the associated guide leg from two opposite sides, which can also provide efficient cleaning.

According to a development of the described embodiments (according to both the first and second aspect of the described embodiments), the cleaning assembly can further comprise an elastic element which is capable of pre-tensioning the at least one first guide leg and/or the at least one second guide leg against the associated cleaning portion.

This development offers the further advantage that the efficiency of the cleaning assembly can thereby be further improved. The elastic element ensures a predetermined pre-tensioning and thus a predetermined pressure of the associated guide leg against the cleaning portion, so that a reliable cleaning can be provided.

The elastic element can comprise various designs, as long as it is only suitable for transmitting a pre-tension to the associated guide leg so that it is pre-tensioned against the cleaning portion, for example a spring element, a plastic or rubber element, and the like.

Furthermore, the elastic element can for its part be arranged in cleaning contact with the associated pretensioned guide leg in such a way that it is capable of stripping off building material residues on the contacted guide leg when the associated at least one first guide leg and/or the associated at least one second guide leg is displaced and/or rotated relative to the associated elastic element. The elastic element thus acts as a cleaning portion in the same way as the cleaning portion against which the elastic element is capable of pre-tensioning the associated guide leg. In this embodiment, the guide leg can also be held in contact from two sides and, when moved relative to the cleaning portion and the elastic element, strips off residues of printing material on them.

In particular, the elastic element can also be attached to the material dispensing unit, in particular the at least one receiving opening of the housing, for example integrally formed or molded onto the housing in the region of the at least one receiving opening of the housing, or detachably fastened to the housing as a separate element.

By attaching the elastic element to the at least one receiving opening, this element can also prevent the penetration of building material residues into the interior of the housing. In particular in an embodiment in which the actuator system for the movement of the guide leg(s) is accommodated in the interior of the housing, such a cleaning barrier is of great advantage in order to protect the components accommodated in the interior of the housing from contamination.

In one conceivable embodiment, the elastic element can be in the form of a separately formed rubber lip which can be attached to the at least one receiving opening of the housing.

It has already been explained above that the elastic element can assume a partial function of the cleaning portion. Accordingly, the elastic element can also have a projection or an edge, in particular a contact contour that forms a negative shape of the contour of the associated guide leg and/or can for example comprise a circumferential rubber element that is inserted into the receiving opening. In this case, the elastic element spans the associated guide leg and simultaneously assumes the function of the elastic element for pre-tensioning, as well as of the cleaning portion.

However, the elastic element can of course also span a region of the guide leg with its contact contour, for example in a direction transverse to the relative movement of the guide leg.

Thus, the elastic element can be arranged on an opposite side to the cleaning portion in the area of the receiving opening of the housing, in such a way that the elastic element is able to strip off building material residues from a first side, and the cleaning portion is able to strip them off from the opposite, second side, of an associated guide leg.

Other alternative embodiments are of course also conceivable, for example solutions with a plurality of cleaning portions, elastic elements, or an assembled multi-part element that fulfills the function of both an elastic element and a cleaning portion.

Thus, regardless of its specific design, the cleaning assembly can have an opening with a circumferential contact contour, as viewed in cross section, which forms a negative shape relative to the contour of the associated guide leg. Here too, the contact contour refers to the contour of the cleaning assembly (viewed in cross section) that can come into contact with the guide leg. In the present case, the guide leg can thus come into contact with the cleaning assembly in its entire cross section and can thus be cleaned from all sides. In this embodiment, the cleaning assembly can also be composed of a plurality of components, for example one or more cleaning portions and/or one or more elastic elements, which together are able to form the circumferential contact contour.

Alternatively or additionally, the device can comprise a lubricating assembly which is designed to wet the at least one first guide leg and/or the at least one second guide leg at least in portions with a lubricating fluid. Such a lubricating fluid serves in particular to reduce the friction between the at least one first guide leg, or the at least one second guide leg and the first or second surface to be shaped by the corresponding guide leg, and in this way to particularly effectively smooth the surface to be shaped.

Here the lubricating fluid can in particular also have water, which is sprayed or otherwise applied onto the at least one first guide leg and/or the at least one second guide leg in order to wet it or them at least in portions.

In particular, in the event of a relative movement of the at least one first guide leg and/or of the at least one second guide leg relative to the material dispensing unit, the movement of the guide leg can be used for particularly simple wetting, for example through the guide leg passing the lubrication assembly during its movement.

In combination with a cleaning assembly as described above, the lubricating fluid, in particular water, can be applied to the surface of the guide leg during a relative movement of the at least one first guide leg and/or the at least one second guide leg relative to the contacted cleaning portion and/or relative to the contacted elastic element. For example, the elastic element can be designed in the form of an elastic sponge to which the cleaning assembly supplies lubricating fluid, for example water, which the elastic element is capable of applying to the associated guide leg in the form of a lubricating film during the relative stripping movement. The guide leg wetted with water can be cleaned in this way, and can at the same time in turn particularly effectively smooth the surface to be shaped of the one or more building material layers with its surface wetted with water.

According to a development of the described embodiments, the at least one first guide leg and/or the at least one second guide leg can have a longitudinal extension along a central longitudinal axis, wherein the at least one first guide leg and/or the at least one second guide leg has or have a contour curved at least in portions in a cross section running perpendicular to the central longitudinal axis (associated with the corresponding guide leg).

Due to this specific cross-sectional contour, the at least one first guide leg and/or the at least one second guide leg can provide a run-in zone and/or a run-out zone in the direction of the movement of the material dispensing unit (print direction) when arranged laterally to the deposited building material layer. In a common application situation, if the at least one first guide leg and/or the at least one second guide leg are used to shape the wall surface of a straight wall-like component, the central longitudinal axis of a guide leg extends substantially parallel to the vertical direction.

Alternatively or additionally, it can be provided that the at least one first guide leg and/or the at least one second guide leg has or have a longitudinal extension along a central longitudinal axis, wherein the at least one first guide leg and/or the at least one second guide leg has or have, in a longitudinal section running along the (corresponding) central longitudinal axis, a contour curved at least in portions with a substantially straight guide portion.

In the common application situation described above, the substantially straight guide portion of a guide leg can extend substantially parallel to the vertical direction.

At the free end of the at least one first guide leg and/or the at least one second guide leg, the leg can have a portion pointing away from the applied building material layer, which portion can form a run-in zone during a vertical translational movement of the guide leg from a rest position into a working position, and can form a run-out zone during a vertical translational movement of the guide leg from a working position into a rest position. Viewed in longitudinal section, this portion pointing away can have a curved contour.

Different smoothing spatulas are known from the prior art, but they have in common a sharp edge on the lower end pointing vertically in the direction of the work surface. In practice, this often leads to the formation of grooves or edges when smoothing the surface. These undesirable surface structures are due above all to the fact that the layers below are pressed together by the subsequent layers and can flow apart slightly as a result of the weight pressure of the subsequent layers (the wall thickness can correspondingly increase downwardly toward the work surface). Accordingly, when shaping the surface of the subsequent layer, the underlying layer is incised with a smoothing spatula, as shown for example in EP 1 587 995 B1, which creates the undesired groove or edge on the lateral surface.

By forming a portion of the guide leg which is lower in the vertical direction and which faces away from the applied building material layer, and thus can form an inlet or outlet zone, an incising of the underlying wider layer(s) can be avoided. At the same time, an effective solution is provided which avoids the formation of such undesired grooves or edges. In particular, a transition contour that is curved when viewed in longitudinal section, from the substantially straight guide portion to the portion pointing away, i.e. the rounded transition to the run-in or run-out zone at the free end of the guide leg, creates a particularly efficient solution for eliminating edges or grooves as a result of a potential constriction when shaping the surfaces.

Furthermore, it can be provided that the at least one first guide leg and/or the at least one second guide leg is or are substantially axially symmetrical with respect to the (corresponding) central longitudinal axis.

Each of the guide legs can be produced from one or a combination of several materials, wherein the material can provide sufficient rigidity for the shaping function of the guide leg and at the same time can provide a non-adhesive surface at least in the region of the shaping portion of the guide leg. To provide a non-adhering surface, materials and coatings from the group comprising polytetrafluoroethylene (PTFE), polyoxymethylene (POM), polydimethylsiloxane, and a POM silicone coating are suitable, for example.

The described embodiments also relate to an arrangement for manufacturing a component, having a device for additive manufacturing of the component according to the preceding and subsequent embodiments with at least one lateral guide leg.

The device or arrangement can optionally have a material preparation device, which comprises, for example, a drop silo and a silo mixing pump. The silo mixing pump can remove the building material from the drop silo in concentrated or dry form in a metered quantity and mix it with a defined quantity of liquid (in particular water). Optionally, an intermediate storage unit can be provided for this mixture. The mixture or the finished building material can finally be conveyed to and through the feed line.

The described embodiments also relate to a method for additive manufacturing of a component, wherein a material dispensing unit for depositing a building material is moved over a work surface by means of an actuator assembly in order to deposit the building material layer by layer in predetermined print paths, and at least one first guide leg which is designed to shape a first surface of one or more of the building material layers deposited by the material dispensing unit, having at least the following method steps:
  a) feeding the building material to the material dispensing unit;
  b) moving the at least one first guide leg with the aid of a first actuator in at least one translational degree of freedom and/or degree of rotational freedom relative to the material dispensing unit;
  c) depositing the building material along the predetermined print path; and
  d) shaping the at least one surface with the aid of the at least one first guide leg;
  e) stripping off building material residues adhering to the at least one first guide leg on a cleaning portion by moving the at least one first guide leg relative to the material dispensing unit with the aid of an actuator.

In the proposed method, step (e) in particular can take place according to predetermined time intervals, for example after completion of the print path, before the elapsing of a material-dependent drying time of the building material, after the end of a working day, and the like.

A control unit for controlling the at least one actuator can thus be used, wherein the predefined time intervals or optionally further parameters, depending on which a controlling is carried out, can be specified in the control unit. For example, on the basis of an additional sensor system or a signal from the control device of the actuator assembly of the material outlet, it can also be determined that a print web is complete or that no further building material is applied (printing process interrupted), whereupon the control unit for controlling the at least one actuator correspondingly activates this actuator for cleaning the guide leg.

In this way, it can be ensured that even in the event of short interruptions in the printing process, or if there is a risk of drying occurring during the printing process, the building material does not dry on a guide leg and thus impair the subsequent shaping process using the guide leg.

The proposed method is also particularly suitable for use with a 3D concrete printer, in particular for use with a 3D concrete printer in gantry design.

Finally, the described embodiments also relate to a computer program comprising control commands which, when the program is executed by a control device, cause the latter to execute a method according to the above and subsequent embodiments.

The control device can be designed as a microprocessor. Instead of a microprocessor, any other device for implementing the control device can also be provided, for example one or more arrangements of discrete electrical components on a printed circuit board, a programmable logic controller (PLC), an application-specific integrated circuit (ASIC) or another programmable circuit, for example also a field programmable gate array (FPGA), a programmable logical arrangement (PLA) and/or a commercially available computer.

Features that have been described in connection with one of the subjects of the described embodiments, namely given by the device according to the described embodiments, the arrangement according to the described embodiments, the method according to the described embodiments, or the computer program according to the described embodiments, can also be advantageously implemented for the other subjects of the described embodiments. Likewise, advantages that were mentioned in connection with one of the subjects of the described embodiments can also be understood in relation to the other subjects of the described embodiments.

In addition, it should be pointed out that terms such as "comprising," "having," or "with" do not exclude any other features or steps. Furthermore, terms such as "one" or "the" which refer to a single number of steps or features do not exclude a plurality of features or steps—and vice versa.

In a puristic embodiment of the described embodiments, however, it may also be provided that the features introduced in the described embodiments by the terms "comprising", "having" or "with" are exhaustively enumerated. Accordingly, one or more enumerations of features may be considered complete within the scope of the described embodiments.

It should be noted that designations such as "first" or "second", etc., are used primarily for purposes of distinguishing respective device or process features and are not necessarily intended to imply that features are mutually dependent or interrelated.

Furthermore, it should be emphasized that the values and parameters described herein include deviations or fluctuations of ±10% or less, preferably ±5% or less, more preferably ±1% or less, and very particularly preferably ±0.1% or less of the named value or parameter, provided that these deviations are not ruled out in practice in the implementation of the described embodiments. The indication of ranges by initial and end values also comprises all those values and fractions which are enclosed by the designated range, in particular the initial and end values and a respective average value.

BRIEF DESCRIPTION OF THE DRAWINGS

Exemplary embodiments are described in more detail below with reference to the drawings.

The figures each show preferred embodiments in which individual features of the described embodiments are shown in combination with one another. Features of an embodiment can also be implemented separately from the other features of the same embodiment and can accordingly be easily combined with features of other embodiments by a person skilled in the art to form further useful combinations and subcombinations.

In the figures, functionally identical elements are provided with the same reference signs.

In the figures, schematically:

FIG. 1 shows a simplified structure of a 3D printer in gantry design;

FIG. 2 is an isometric representation of a device according to a first embodiment;

FIGS. 3a, 3b, 3c show a cutaway view of the device shown in FIG. 2;

FIG. 4 shows the sectional view G-G according to the sectional line G-G in FIG. 3a;

FIGS. 5a, 5b show the sectional view A-A and B-B according to the sectional planes A-A and B-B in FIG. 2;

FIG. 6 shows a cutaway view of the device shown in FIG. 2 according to a second embodiment;

FIG. 7 shows a sectional view of the device according to a second embodiment, which corresponds to the sectional view A-A as shown in FIG. 2;

FIG. 8 shows a sectional view C-C of the device according to the sectional plane C-C in FIG. 2;

FIG. 9 shows the detail view D according to FIG. 8; and

FIG. 10 shows an isometric detail view of the device according to FIGS. 8 and 9.

DETAILED DESCRIPTION

Figure 1:
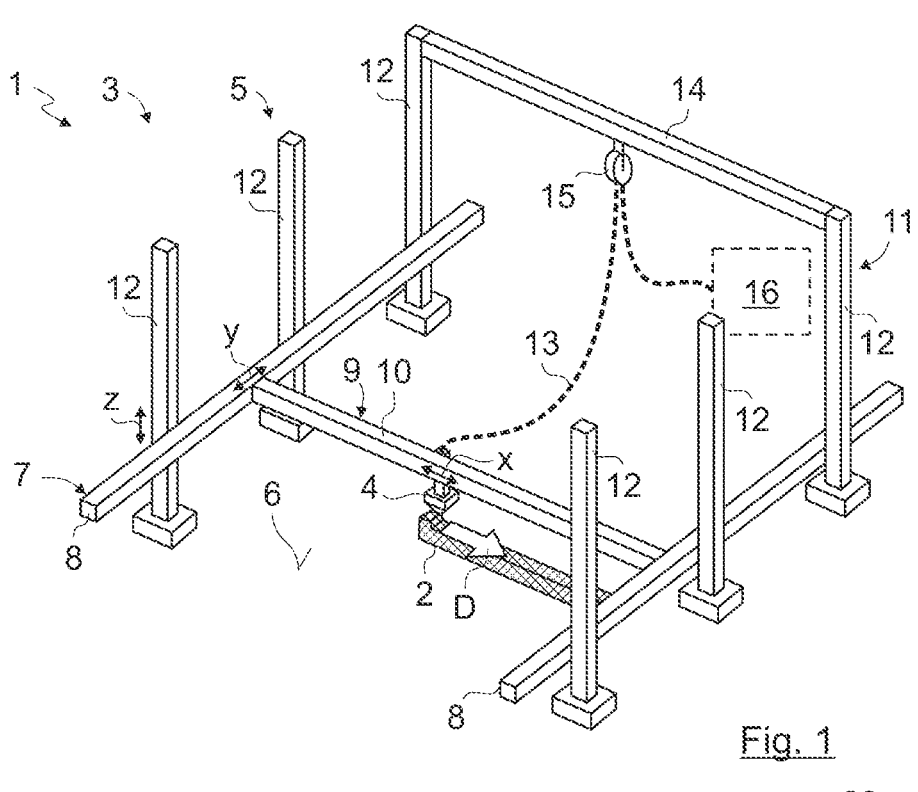

FIG. 1 shows a highly simplified arrangement 1 for the additive manufacturing of a component 2. The arrangement 1 comprises a device 3 for additive manufacturing of the component 2, with a material dispensing unit 4, indicated only schematically, for depositing a building material, and an actuator assembly 5 which is designed to move the material dispensing unit 4 over a work surface 6 in order to deposit the building material layer by layer in predetermined print paths D.

The embodiments are described below in particular in the context of 3D concrete printing, i.e. for the additive manufacture of a component 2 of a structure or of a complete structure from flowable mixed concrete. However, this is fundamentally not to be understood as limiting. The described embodiments are basically suitable for producing any additive components from any building material, in particular also for the manufacture of plastic components.

In order to move the material dispensing unit 4, the actuator assembly 5 has at least one first horizontal guide 7, which in FIG. 1 and the following exemplary embodiments are each two horizontal supports 8 arranged in parallel and at a distance from one another. A second horizontal guide 9 is provided between these two horizontal supports 8, which guide is thus linearly movable along the first horizontal guide 7. The second horizontal guide 9 is designed as an individual cross-member 10 along which the material dispensing unit 4 can be moved in the manner of a trolley, i.e. transversely to the first horizontal guide 7. Finally, a two-dimensional movement of the material dispensing unit 4 over the work surface 6 can be allowed by the two horizontal guides 7, 9 (cf. arrows "x" and "y").

In addition, the actuator assembly 5 according to FIG. 1 has a vertical guide 11 along which the material dispensing unit 4 can be moved vertically relative to the work surface 6. Specifically, it can be provided that the vertical guide 11 has two groups of vertical struts 12, wherein the vertical struts 12 of each group are spaced apart from one another and are arranged in alignment with one another, and wherein both groups are spaced apart from one another. The first horizontal guide 7, or the horizontal supports 8 of the first horizontal guide 7, can thus be moved along the vertical struts 12 of the corresponding group (cf. arrow "z").

A traverse 14, which is mounted, for example, on two vertical struts 12 of the vertical guide, also carries a deflection roller 15 via which a conveying hose 13 for dry mortar is guided from a material preparation unit 16 (indicated as a black box) to the material dispensing unit 4.

FIG. 1 and the exemplary embodiments thus show a 3D concrete printer in gantry design with linear axis guidance in each case. This allows the material dispensing unit 4 to move along all translational degrees of freedom x, y, z. Gantry printers, in particular for manufacturing concrete components 2 from concrete, are already known in principle, which is why additional details are not discussed further here.

The aim of the described embodiments is to improve the shaping, in particular the surface treatment, of the lateral surfaces of a printed component with the aid of lateral guide legs and the handling of such guide legs.

Figure 2:
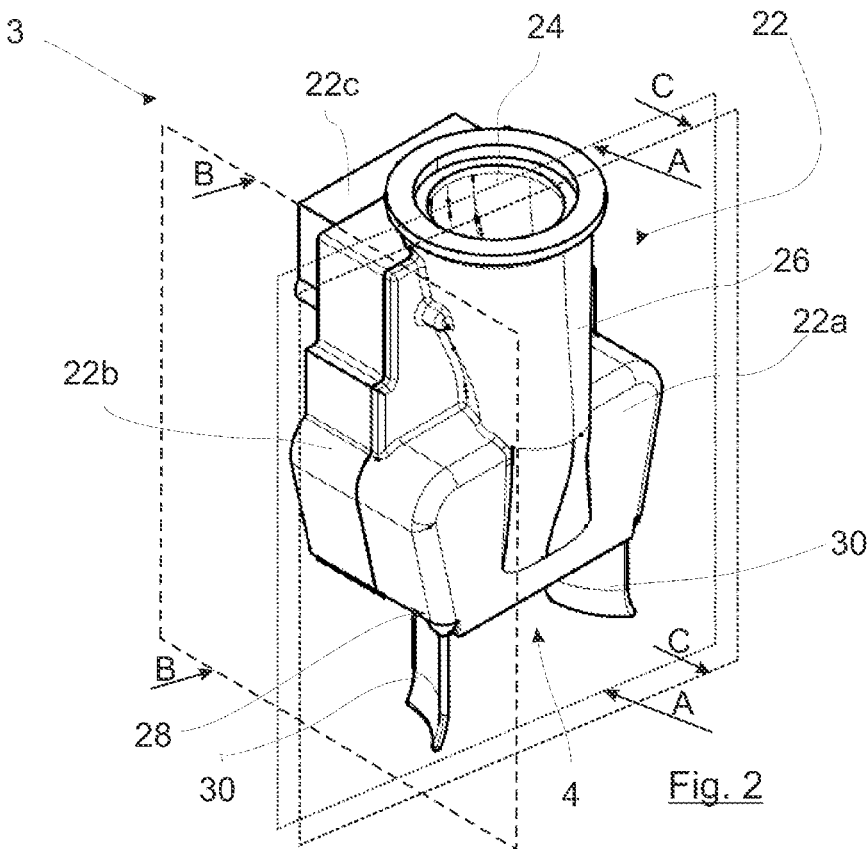
Figures 8, 9, 10:
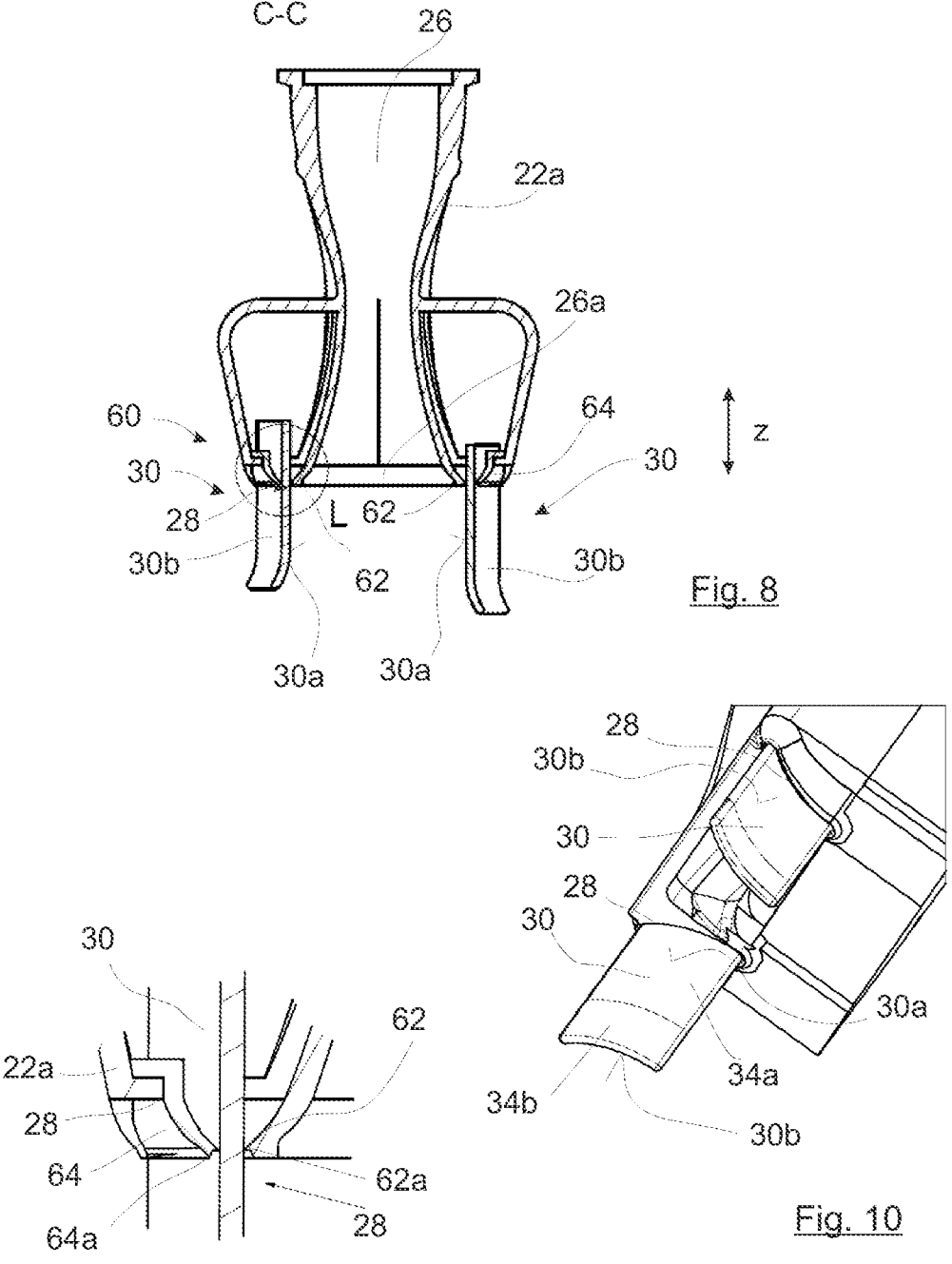

FIG. 2 shows an isometric view of a device 3 according to the described embodiments for additive manufacturing of a component 2 with improved shaping. FIGS. 3a to 3c, FIG. 4, and FIGS. 5a and 5b show a specific exemplary embodiment with further details, in an enlarged detail of the device 3; FIGS. 6 and 7 show a second exemplary embodiment, wherein the views substantially correspond to the representations of the first embodiment according to FIGS. 3a and 5a. Finally, FIGS. 8 to 10 show a further detail of the described embodiments, the cleaning assembly, in multiple views.

FIG. 2 shows an isometric representation of a device according to the described embodiments, in particular a housing 20 having a plurality of housing parts or housing regions. It can be seen that the housing 20 has at least three housing parts or housing regions, namely a front housing cover 22a, a central housing region 22b, and a rear housing cover 22c.

The front housing cover 22a and the central housing area 22b together form a material feed region 24 via which a building material can be fed from the guide hose 13 via an extruder (not shown) in a known manner. A building material duct 26, which opens into a discharge opening 26a, is formed in the interior of the housing 20 in order to discharge the building material. The formed duct is indicated in the representation of FIG. 2 by the outer contour of the housing cover 22a (cf. reference sign 26).

The guide legs 30, also seen in FIG. 2, are important to the described embodiments, wherein in the embodiment shown the device 3 has a first guide leg 30 and a second guide leg 30 which are substantially of identical design, so that reference is made below primarily to the first guide leg 30.

In the described embodiments, the guide legs 30 are used to (subsequently) smooth the lateral surfaces of an applied building layer, for example to reduce the occurrence of grooves or edges in the not yet fully cured building material of a component 2 to be formed. The layers of building material dispensed by the material dispensing unit 4 are applied on top of one another in print paths D in the manner of tracks, wherein unevenness can form between the individual layers, for example. Other effects that can cause undesirable unevenness on the lateral surfaces of a component have been discussed above and can also be reduced by the guide legs 30 shown.

A special feature of the described embodiments is that the guide legs 30 protrude at least in portions into the housing 20 of the device 3 through at least one, in the embodiment shown through two, receiving openings 28 (cf. in particular also the further FIGS. 3a to 10). As can also be seen in the figures, the receiving openings 28 can be formed in a plurality of adjacent housing parts, for example as shown in the front housing cover 22a and the middle housing region 22b.

Finally, FIG. 2 shows three sectional planes A-A, B-B, and C-C, wherein the sections formed thereby illustrate the features of the described embodiments in more detail.

Figures 3B, 3C:
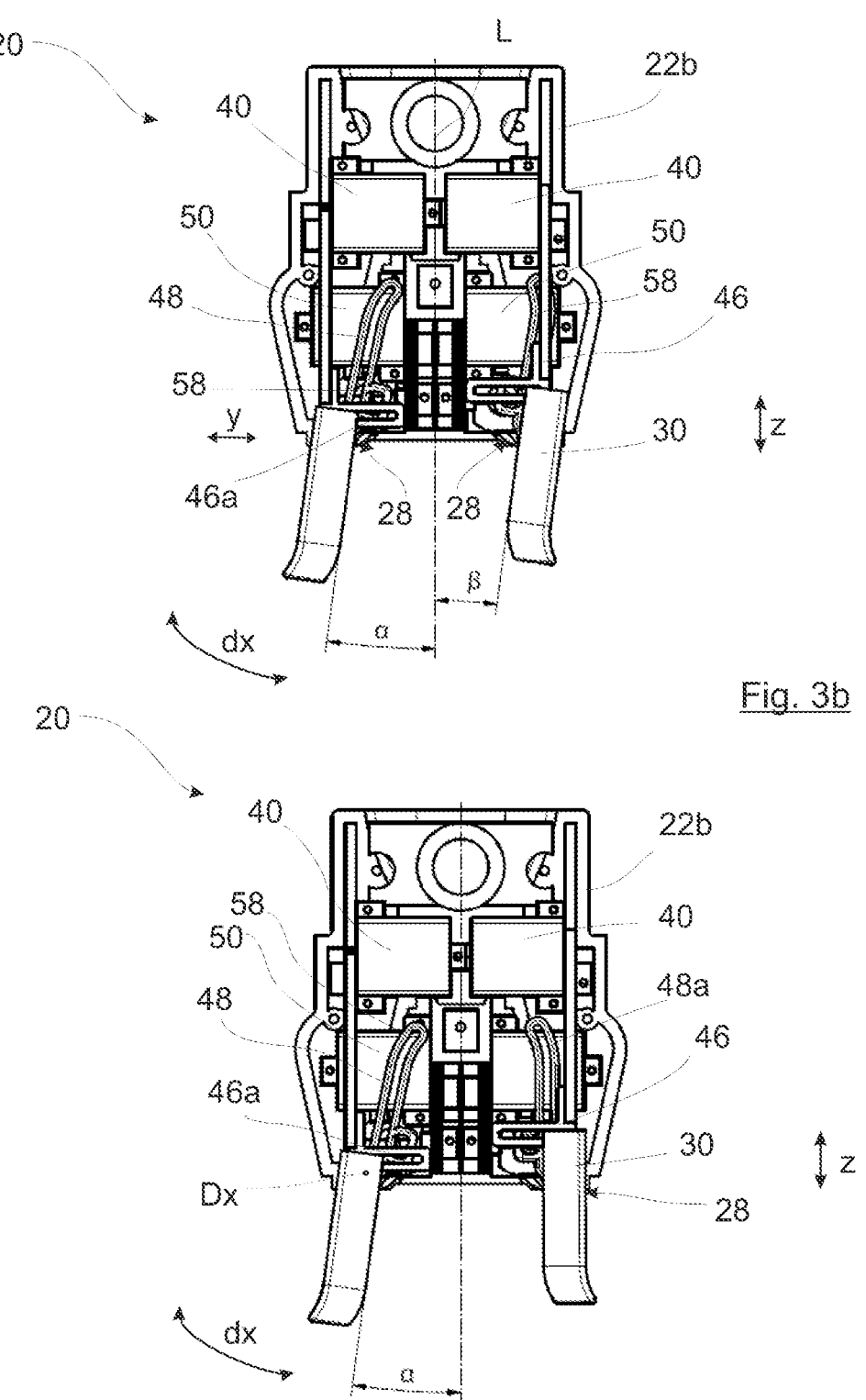

FIGS. 3a to 3c show the device 3 according to the described embodiments according to FIG. 2 in a front view, omitting the front housing cover 22a. FIG. 4 is a sectional view of the section along the bent sectional line G-G of FIG. 3a.

It can be seen in FIGS. 3b and 3c that the guide legs 30 can both be translationally displaced in a vertical direction, i.e. upward or downward in the figures (indicated by the arrow z), and can also be set at an angle of incidence α and β relative to a longitudinal axis L of the housing 20. For this purpose, the guide legs 30 can be pivoted about an axis of rotation in a rotational degree of freedom dx.

In the embodiment shown, the longitudinal axis L (cf. FIGS. 3b, 3c) of the housing 20 coincides with a perpendicular to the work surface 6 and thus with the vertical direction, wherein, when the device 3 is tilted relative to a perpendicular to the work surface 6, these may no longer coincide. In the present case, for a simplified description of the described embodiments, it is assumed that the device 3 is oriented precisely vertically in such a way that the longitudinal axis L of the housing 20 coincides with a perpendicular to the work surface 6.

In the simplified representation of the described embodiments discussed below, the component 2 also has a substantially vertical extension without overhangs in the horizontal direction, whereby two lateral surfaces that delimit the wall thickness are formed, which surfaces are substantially perpendicular to the work surface 6 and can be smoothed by the guide legs 30. In principle, a vertical displaceability of the guide legs 30, as shown, for example, in the exemplary embodiment of FIGS. 6 and 7, is also sufficient for such a comparatively simple geometry and smoothing task.

FIGS. 6 and 7 also show a representation without the front housing cover 22a (FIG. 6) and a sectional representation according to the sectional plane A-A of FIG. 2 (FIG. 7), wherein FIGS. 6 and 7 relate to a second embodiment, for which reason the section in FIG. 7 is designated A'-A'.

FIG. 7 also makes it easy to understand the structure of the device, while FIG. 6 shows the guide leg 30 in a rest position almost completely retracted into the housing 20.

In FIG. 7, on the left it can be seen that the first guide leg (in the representation the guide legs have been omitted in the representation for simplification) can be moved up and down in the vertical direction z with the aid of an actuator 40 (also indicated by the driven output shaft 40a).

In the present case, the actuator 40 can comprise a servomotor which is accommodated in the rear housing cover 22c and is configured to drive a toothed wheel 42 (omitted on the right-hand side), which in turn is in meshing engagement with a toothed rack 44 (omitted on the right-hand side), whereby a driver 46 (omitted on the right-hand side) can be moved up and down with the guide leg (not shown).

In FIGS. 6 and 7, the two actuators for moving the guide legs are both designated by the reference sign 40. Theoretically, this can be an actuator that is suitable for moving both guide legs, for example via a coupling assembly. However, it can in particular also be two actuators 40 which can be operated independently of one another and are each associated with one of the guide legs 30 and adjust the two guide legs individually and independently of one another.

Furthermore, a guide contour 48 can be seen in particular at the right in FIG. 7, which can be formed directly on the housing 20 or on a separate component which can be arranged on the housing 20, in particular the central housing region 22b.

In the simplified embodiment of FIGS. 6 and 7, in which the guide legs 30 are moved up and down only in a substantially vertical direction z, the guide contour 48 can be fixedly connected to the housing 20.

This guide contour 48 serves, in particular with the curved region formed at an end region 48a, to introduce a slight pivoting movement of the free end of the associated guide leg 30 into this leg when the guide leg 30 is almost completely retracted into the housing 20 (cf. FIG. 6).

It can be seen that the guide leg 30 is connected to the driver 46 by a pin (indicated in FIG. 7 by the reference sign 32), wherein the pin 32 can execute a slight horizontal movement relative to the driver 46 within a horizontally running groove 46a. As a result, the slight pivoting movement of the free end of the associated guide leg 30 can take place when it is retracted almost completely into the housing 20.

This slight pivoting movement is also allowed by the specific design of the guide legs 30, which have an elongated contour with a flat guide portion 34a and a curved end portion 34b when viewed in longitudinal section (along their central longitudinal axis) (see also FIG. 5b). By means of the guide contour 48 and the horizontal relative movement of the guide leg pin 32 relative to the driver 46, this curved end portion 34b can also be retracted or pivoted into the housing 20.

The curved end region 34b (curved away from the surface to be shaped when viewed in a central longitudinal section) forms a run-in or run-out zone in relation to a vertical movement of the guide legs relative to the component 2, in particular relative to the surface to be shaped, which is particularly advantageous for smoothing the transitions. Furthermore, this can reduce or completely avoid the constriction of the lower layers of building material known from practice with flat smoothing spatulas, as described above, which in turn can reduce or avoid the known and undesirable effect of edge formation.

A further special feature of the design of the guide legs 30 can also be clearly seen in FIGS. 4 and 9. Viewed in cross section, these are not straight (and thus flat, at least at the guide portion 34a), as is known from the prior art, but have a curvature. This curvature can be continuous, as in the embodiment shown, but it is also possible to provide a curvature only at the end portions (viewed in cross section), while a central region (viewed in cross section) can be flat. This specific design allows a run-in zone and run-out zone to be created in relation to the direction of movement x when printing the print paths B, which is particularly favorable for the shaping process, especially for smoothing.

In contrast to the comparatively simpler embodiment of FIGS. 6 and 7, which provides a substantially only vertical relative displacement of the guide legs 30 relative to the material dispensing unit 4 from a working position, in which the guide legs 30 are capable of shaping, in particular smoothing, the lateral surfaces (first surface and second surface) of a component 2, into a rest position in which the guide legs 30 are almost completely retracted into the housing 20, in the embodiments of FIGS. 3a to 3c, 4 and 5a to 5b the guide legs 30 can additionally be pivoted relative to the material dispensing unit 4 in at least one rotational degree of freedom dx.

Alternatively or in addition to the solution shown, it can of course be provided that a pivoting takes place in a further rotational degree of freedom, indicated by the rotational degrees of freedom (in FIG. 3a) dy and dz.

In particular, FIGS. 3b and 3c show how at least one of the guide legs 30 can be pivoted in an angle of incidence α or β relative to the material dispensing unit 4 (shown here symbolically by the axis L). Both a pivoting of the end portion 34b of the guide leg 30 away from the material dispensing unit 4 (angle α) and toward the material dispensing unit 4 (angle β) are possible here. In this way, for example overhangs and inclined walls of a component 2, but also tapered end portions of a component 2, can be smoothed.

It can also be seen in FIGS. 3b and 3c that the guide legs 30 are individually adjustable, both with respect to their vertical relative position (as also in the embodiment of FIGS. 6 and 7) and with respect to their rotational position relative to the material dispensing unit 4.

For this purpose, a first or third actuator 40 is provided in a manner comparable to the first embodiment, which actuator serves to displace the guide legs 30 in the vertical direction z. In the present case, the actuator 40 can comprise a servomotor which is accommodated in the rear housing cover 22c or, as shown, in the central housing region 22b, and is configured to drive a toothed wheel 42, which in turn is in meshing engagement with a toothed rack 44, whereby a driver 46 can be moved up and down with the connected guide leg 30 (in FIG. 5a, these have been omitted for simplification).

In FIGS. 5a, 5b, the two actuators for vertically moving the guide legs are both designated by the reference sign 40. Theoretically, this can be an actuator that is suitable for moving both guide legs, for example via a coupling assembly. However, it can in particular also be two actuators 40 which can be operated independently of one another and are each associated with one of the guide legs 30 and adjust the two guide legs individually and independently of one another.

Furthermore, a second mechanism for pivoting the guide legs 30 is provided. This mechanism also comprises an actuator 50, i.e. a second actuator 50 and a fourth actuator 50, which, analogous to the first and third actuators, can comprise a common actuator or, as shown, two actuators 50 that can be operated independently of one another. Each of the actuators 50 is designed to rotationally drive a toothed wheel (spur gear) 52 with its output shaft 50a. A further toothed wheel 54, which is connected to a spindle 56 in a non-rotatable manner, is in meshing engagement with the toothed wheel 52. In the embodiment shown, a further driver 58, which is displaced into horizontal movement in the y-direction when the spindle 56 is driven (cf. FIG. 5a), is seated on the spindle 56.

In the embodiment shown, the second driver 58 is formed in one piece with a guide contour 48. Within the guide contour 48, a pin (indicated in FIG. 5a by the reference sign 32) is connected to the second driver 58, wherein the pin 32 can execute a substantially vertical movement relative to the second driver 58 within a substantially vertically running guide groove of the guide contour 48.

As in the simplified embodiment of FIGS. 6 and 7, in which the guide legs 30 are moved up and down only in a substantially vertical direction, the guide contour 48 also serves, in particular with the curved region formed at an end region 48a, to introduce a slight pivoting movement of the free end of the associated guide leg 30 into this leg when the guide leg 30 is almost completely retracted into the housing 20.

It can be seen that the guide leg 30, as in the embodiment of FIGS. 6 and 7, is additionally connected to the driver 46 (and also to the driver 48) with its pin (indicated in FIG. 5a by the reference sign 32), wherein the pin 32 can execute a horizontal movement relative to the driver 46 in the direction y within a horizontally running groove 46a.

As a result, on the one hand the slight pivoting movement of the free end of the associated guide leg 30 (with the bent end portion 34*b*) can take place when it is retracted or pivoted almost completely into the housing 20. On the other hand, this also allows the pivoting movement to be achieved in order to implement the angles of attack shown in FIGS. 3*b* and 3*c*.

In this embodiment as well, the slight pivoting movement allows the guide legs 30, which have an elongated contour with a flat guide portion 34*a* and a curved end portion 34*b* when viewed in a longitudinal section (cf. FIG. 5*b* also), to be retracted or pivoted into the housing 20 with the curved end portion 34*b*.

Furthermore, the second driver 58 is mounted at a bearing point on the housing 20 so as to be pivotable relative thereto about an axis of rotation Dx (indicated in FIG. 3*b*). The axis of rotation Dx extends substantially parallel to the print path D or moves with it, whereby components with curved print paths can also be smoothed laterally.

As a result of a pivoting movement of the second driver 58, the guide contour 48 is also pivoted along with it, such that the guide groove of the guide contour 48 no longer extends substantially vertically in the direction z but at an angle to it (in accordance with the angle of incidence; cf. FIGS. 3*b* and 3*c*). Accordingly, when there is a vertical movement of the associated guide leg 30 initiated by the actuator 40, the connecting pin 32 of the guide leg 30 executes a translational movement along the guide contour 48 at the selected angle of incidence.

Furthermore, the contact surfaces of the receiving openings 28 form a support for the corresponding guide leg 30, so that this leg, seated thereon, is pivoted accordingly in a degree of freedom dx by the pivoting movement of the second driver 58 and the guided entrainment of its pin 32 in the guide contour 48 of the second driver 58.

The actuators 50 and the transmission and connection structures provided in the form of the described components thus provide a pivoting movement of the guide legs 30 relative to the material dispensing unit 4 in addition to a vertical displacement movement relative to the material dispensing unit 4.

The actuators 40 and 50 can be actuated individually and can thus implement a completely individual adjustment of the guide legs 30. Furthermore, the actuators can be operated simultaneously, wherein the transmission and connection structures are designed in such a way that they do not interfere with each other when the actuators are operated simultaneously, so that a simultaneous movement is made possible both in a translational degree of freedom z and in a rotational degree of freedom dx.

In this embodiment as well, the actuators 40, 50 can in particular be designed as servomotors and can in particular be accommodated in the rear housing cover 22*c* or the central housing region 22*b*.

A further special feature of the described embodiments is shown in FIGS. 8 to 10.

The multi-part device 3 (see FIG. 2) with its front housing cover 22*a* comprises a cleaning assembly 60, which in the embodiment shown is arranged in the region of the housing opening (receiving opening) 28. This opening serves both to protect against building material residues drying out on the guide legs 30, in particular in a rest position, and to protect the transmission and connection structures in the interior of the housing 20 from contamination.

This comprises a cleaning portion 62 in the form of an edge which, when in contact with the associated guide leg 30 (in particular on its shaping side), is capable of stripping off building material residues from the contacted surface (the shaping side) of the guide leg during a translational relative movement.

As already explained in connection with FIGS. 3*a* to 7, in each of the two embodiments the guide legs 30 can be moved by means of the actuators 40 at least in a vertical movement in the direction z relative to the housing 20 of the material dispensing unit 4. The cleaning assembly 60 with the cleaning portion 62 is attached to the housing 20, in particular in the embodiment shown in FIGS. 8 to 10 in the region of the receiving openings 28. Thus, each receiving opening 28 has an edge 62*a* on its side facing the discharge opening 26*a* of the material dispensing unit 4, which edge rests against the associated guide leg 30 on a shaping side 30*a* of the guide leg.

The term "shaping side" here refers to the side of the guide leg 30 that also faces the discharge opening 26*a* of the material dispensing unit 4. The substantial smoothing effect of the guide leg is achieved with the shaping side 30*a* of the guide leg 30, because this side comes into contact with the surface to be smoothed. Accordingly, the shaping sides 30*a* of the guide legs 30 are situated quasi-opposite one another, and in the shown arrangement they laterally delimit the space into which the building material is discharged as a building material layer through the discharge opening 26*a*.

In the arrangement shown in FIG. 8, the guide legs 30 can be in a working position in which their shaping sides 30*a* can be in shaping contact with a building material layer (not shown). If the guide legs 30 are now retracted upwards in the vertical direction z into the interior of the housing 20 (only the front housing cover 22*a* is shown in FIG. 8), each of the guide legs 30 strips off any building material residues that may still adhere to the shaping surface 30*a* on the associated edge 62*a* of the cleaning portion 62. The shaping side 30*a* of the guide legs 30 is cleaned in this way.

Furthermore, an elastic cleaning element 64 can be seen which is arranged on the opposite side of the receiving opening 28 and has, for example, a rubber lip. The elastic cleaning element 64 pre-tensions the abutting guide leg 30 at least slightly and holds it in contact with the cleaning portion 62. In this way, it is ensured that the shaping surface 30*a* of the guide leg remains in contact with the cleaning portion 62 over the entire width (i.e. in the horizontal direction) and that building material residues can be reliably stripped off.

In addition, the elastic cleaning element 64 is also suitable for stripping off any building material residues on the abutting surface (on the side 30*b* opposite the shaping side 30*a* of the guide leg) of the associated guide leg 30, if necessary. For this purpose, the elastic cleaning element 64 also has an edge 64*a*. In the same way as the edge 62*a* of the cleaning portion 62, this edge acts as a stripper for any building material residues on the side 30*b* of the guide leg 30 when the guide leg 30 is moved vertically upwards in direction z (i.e. into the interior of the housing).

The elastic cleaning element 64 of the shown embodiment, which is designed as a rubber lip in the embodiment shown, also seals the receiving opening 28 of the housing 20, which is particularly favorable for protecting the components accommodated therein.

It can be seen in FIG. 10 that both the cleaning portion 62 and the elastic element 64 have a contact contour which in each case has a negative contour relative to the contour of the associated guide leg 30 in the region of contact with the guide leg 30. In the embodiment shown, this means that the cleaning portion 62, i.e. the edge 62*a*, as well as the elastic element 64, have a curvature when viewed in cross section which allows contact with the corresponding curvature of the shaping side 30*a* or the opposite side 30*b* of the guide leg 30. A particularly efficient and full-surface cleaning of the guide leg on the shaping side 30*a* and the opposite side 30*b* is thereby made possible. Of course, this can also be advantageous in particular for a particularly efficient lubrication.

Finally, FIG. 10 shows that the cleaning assembly 60 can have a closed contact contour when viewed in cross section, which represents a negative shape of the entire cross section of the guide leg 30, and the cleaning assembly 60 thus completely encloses the guide leg 30. Here the cleaning portion 62 and the elastic element 64 can merge into one another or further cleaning portions can be provided in order to connect them to form a closed contact contour spanning the guide leg 30. Any further cleaning portions can accordingly also have a cleaning edge in the manner of the edge 62*a*, which projects inwards toward the guide leg and allows building material residues to be stripped off.

It is also possible for only one elastic cleaning element in the form of a rubber ring to be inserted into the receiving opening 28 and, in a comparable manner, to span the entire guide leg with a contact contour that has a negative contour relative to the contour of the guide leg (viewed in cross section). In such a solution, the elastic cleaning element assumes the partial function of cleaning the cleaning portion 62.

Finally, the elastic cleaning element 64 can also serve as a lubricating element in a manner which is not shown, in which this lubricating element is capable of applying a lubricating fluid, for example water, to the associated guide leg 30. For this purpose, the elastic cleaning element 64 can also be inserted as a circumferential element, for example as a rubber ring into the receiving recess 28 of the housing 20.

It is also not shown that the controlling of the actuators 40, 50 can take place via an additional control unit and/or via the control device for controlling the actuator assembly 5. On this, see the statements in the introduction to the description.

The invention claimed is:

1. A device for additive manufacturing of a component, comprising:

a material dispensing unit for depositing a building material and an actuator assembly which is designed to move the material dispensing unit over a work surface in order to deposit the building material layer by layer in predetermined print paths, and at least one first guide leg which is designed to shape a first surface of the one or more layers of building material deposited by the material dispensing unit, wherein the at least one first guide leg is movable, driven by an actuator, in at least one translational degree of freedom (x, y, z) and/or rotational degree of freedom (dx, dy, dz) relative to the material dispensing unit, wherein the device has a cleaning assembly with at least one cleaning portion associated with the at least one first guide leg, wherein in at least one relative position of the at least one first guide leg relative to the material dispensing unit, the cleaning portion is arranged at least in portions in cleaning contact with the associated guide leg, in such a way that during a movement relative to the material dispensing unit, the at least one first guide leg is capable of stripping off building material residues on the cleaning portion, which is in cleaning contact at least in portions.

2. A device for additive manufacturing of a component, comprising:

a material dispensing unit for depositing a building material and an actuator assembly which is designed to move the material dispensing unit over a work surface in order to deposit the building material layer by layer in predetermined print paths, and at least one first guide leg which is designed to shape a first surface of the one or more layers of building material deposited by the material dispensing unit in a working position of the at least one first guide leg, wherein the at least one first guide leg is movable, driven by a first actuator, in at least one degree of freedom, wherein the material dispensing unit comprises a housing, wherein the at least one first guide leg can be moved, driven by a first actuator, from a working position, in which the at least one first guide leg is able to shape the first surface, into a rest position in which the at least one first guide leg is accommodated at least in portions.

3. The device according to claim 1, wherein the movement, driven by the actuator, of the at least one first guide leg relative to the material dispensing unit comprises a movement of the at least one first guide leg in the vertical direction.

4. The device according to claim 1, wherein the device has at least one second guide leg for shaping a second surface of the one or more layers of building material deposited by the material dispensing unit, which, driven by an actuator, can be moved relative to the material dispensing unit in at least one degree of translational freedom (x, y, z) and/or degree of rotational freedom (dx, dy, dz), the cleaning assembly having at least one cleaning portion associated with the at least one second guide leg, wherein in at least one position of the at least one second guide leg relative to the material dispensing unit, the cleaning portion is arranged at least in portions in cleaning contact with the associated guide leg in such a way that the at least one second guide leg is able to strip off building material residues on the cleaning portion lying at least in portions in cleaning contact, during a movement relative to the material dispensing unit.

5. The device according to claim 4, wherein the at least one first guide leg and the at least one second guide leg can be moved independently of one another by the corresponding actuators associated with the guide legs.

6. The device according to claim 1, wherein the at least one first guide leg and the at least one second guide leg can be displaced together, driven by an actuator, at least in one translational degree of freedom (x, y, z) relative to the material dispensing unit, wherein at least one of the at least one first guide leg and the at least one second guide leg is connected to the actuator by means of a coupling assembly.

7. The device according to claim 4, wherein the at least one first guide leg and/or the at least one second guide leg can be displaced, driven by a further actuator, at least in one further translational degree of freedom (x, y, z) relative to the material dispensing unit and/or can be pivoted in a further rotational degree of freedom (dx, dy, dz) relative to the material dispensing unit.

8. The device according to claim 1, wherein the device has at least one control unit which is configured to control at least one actuator for moving the at least one first guide leg and/or the at least one second guide leg.

9. The device according to claim 8, wherein the device further comprises at least one control device which is configured to control the actuator assembly for moving the material dispensing unit over the work surface, wherein the at least one control device can comprise the at least one control unit for controlling the at least one actuator for moving the at least one first guide leg and/or the at least one second guide leg and/or can be in communicative connection with the at least one control unit.

10. The device according to claim 9, wherein the control device, which is configured to control the actuator assembly for moving the material dispensing unit over the work surface, has an inter-face in order to obtain, via the interface, 3D data of a component to be produced, and a computing unit in order to convert the obtained 3D data into printer data for additive manufacturing of the component, based on which both the actuator assembly for moving the material dispensing unit can be controlled by the control device and also at least one of the actuators for moving the at least one first guide leg and/or the at least one second guide leg can be controlled by the control device and/or the control unit communicatively connected thereto.

11. The device according to claim 1, wherein the material dispensing unit has a housing, wherein the housing has at least one receiving opening.

12. The device according to claim 11, wherein the at least one first guide leg and/or the at least one second guide leg can, in a working position, project at least in portions through the at least one receiving opening from the interior of the housing, and/or the at least one first guide leg and/or the at least one second guide leg can, in a rest position, be accommodated, at least in portions, in the housing.

13. The device according to claim 11, wherein the cleaning portion associated with the at least one first guide leg and/or the at least one second guide leg is arranged on the housing of the material dispensing unit, in particular in the region of the at least one receiving opening of the housing.

14. The device according to claim 1, wherein the cleaning portion has a separate component or is integrally formed with the material dispensing unit, in particular with a housing of the material dispensing unit.

15. The device according to claim 1, wherein the cleaning portion has a projection or an edge, wherein the cleaning portion in particular has a contact contour which forms a negative shape relative to the contour of the associated guide leg at least in the contact region of the guide leg on the associated cleaning portion.

16. The device according to claim 1, wherein the cleaning assembly has at least one elastic element which is capable of pre-tensioning the at least one first guide leg and/or the at least one second guide leg against the associated cleaning portion.

17. The device according to claim 16, wherein in at least one relative position of the associated guide leg relative to the material dispensing unit, the elastic element of the cleaning assembly is arranged at least in portions in cleaning contact with the associated guide leg in such a way that during a movement relative to the material dispensing unit, the associated guide leg is capable of stripping off building material residues on the elastic element of the cleaning assembly, which is in cleaning contact at least in portions.

18. The device according to claim 16, wherein the elastic element is arranged on the material dispensing unit, in particular on a housing of the material dispensing unit, wherein the elastic element has, in particular, a separate component or is formed integrally with the material dispensing unit, in particular with a housing of the material dispensing unit.

19. The device according to claim 1, wherein the elastic element has a projection or an edge, wherein the elastic element in particular has a contact contour which forms a negative shape relative to the contour of the associated guide leg at least in the contact region of the guide leg on the associated elastic element.

20. The device according to claim 1, wherein the at least one first guide leg has a shaping side and a side opposite the shaping side, wherein the cleaning portion is capable of interacting with an elastic element of the cleaning assembly in such a way that the associated guide leg is able to wipe its shaping side on the cleaning portion and to wipe its opposite side on the elastic element.

21. The device according to claim 1, wherein when viewed in cross section, the cleaning assembly has an opening with a circumferential contact contour which forms a negative shape to the contour of the associated guide leg.

22. The device according to claim 1, wherein the device comprises a lubricating assembly which is designed to dispense a lubricating fluid to the at least one first guide leg and/or the at least one second guide leg in order to wet this leg or legs with the lubricating fluid at least in portions.

23. The device according to claim 22, wherein the cleaning assembly, in particular the elastic element of the cleaning assembly is configured to wet the associated guide leg with a lubricating fluid dispensed by the lubricating assembly.

24. The device according to claim 1, wherein at least one of the actuators for moving the at least one first guide leg and/or the at least one second guide leg has at least one motorized drive, in particular a servomotor, a closed-loop motor, a stepper motor or the like, which is suitable for returning its current position to a control unit or control device.

25. The device according to claim 1, wherein at least one of the actuators is connected to the at least one first guide leg and/or to the at least one second guide leg via at least one transmission and/or connection structure, in order to transmit a drive movement of the actuator to the connected at least one first guide leg and/or the connected at least one second guide leg.

26. The device according to claim 25, wherein the at least one transmission and/or connection structure comprises a rack, drive rod, control rod, and/or spindle, which is connected directly or indirectly to the at least one first guide leg and/or to the at least one second guide leg in such a way that a drive movement of the actuator can be transmitted directly or in converted and/or translated form to the connected at least one first guide leg and/or to at least one second guide leg.

27. The device according to claim 1, wherein the at least one first guide leg and/or the at least one second guide leg has or have a longitudinal extension along a first or second central longitudinal axis, wherein the at least one first guide leg and/or the at least one second guide leg has or have a contour curved at least in portions in a cross section running perpendicular to the first or second central longitudinal axis.

28. The device according to claim 1, wherein the at least one first guide leg and/or the at least one second guide leg has or have a longitudinal extension along a first or second central longitudinal axis, wherein the at least one first guide leg and/or the at least one second guide leg has or have, in a longitudinal section running along the first or second central longitudinal axis, a contour curved at least in portions with a substantially straight guide portion.

29. The device according to claim 1, wherein the at least one first guide leg and/or the at least one second guide leg is or are designed substantially axially symmetrically with respect to the central longitudinal axis of the respective guide leg.

30. A method for additive manufacturing of a component, wherein a material dispensing unit for depositing a building material is moved over a work surface by means of an actuator assembly in order to deposit the building material layer by layer in predetermined print paths, having at least the following method steps:

a) feeding the building material to the material dispensing unit;

b) moving the at least one first guide leg with the aid of an actuator relative to the material dispensing unit;

c) depositing the building material along the predetermined print path, and d) shaping the at least one surface with the aid of the at least one first guide leg;

e) stripping off building material residues adhering to the at least one first guide leg on a cleaning portion by moving the at least one first guide leg relative to the material dispensing unit with the aid of an actuator.

31. The method according to claim 30, wherein the step b is carried out according to predetermined time intervals, wherein the at least one actuator is controlled by a control unit in order to move the at least one first guide leg relative to the material dispensing unit, wherein the predetermined time intervals can be defined in the control unit, depending on at least one of the selected building material, the building material thickness of the applied printed layers, or depending on whether building material is deposited according to step c.

32. The method according to claim 30, wherein the movement, driven by the actuator, of the at least one first guide leg relative to the material dispensing unit according to step b comprises a movement of the at least one first guide leg in the vertical direction.

* * * * *